(12) United States Patent
Hosoki

(10) Patent No.: US 9,235,073 B2
(45) Date of Patent: Jan. 12, 2016

(54) DISPLAY DEVICE AND TELEVISION RECEPTION APPARATUS

(71) Applicant: Sharp Kabushiki Kaisha, Osaka (JP)

(72) Inventor: Mitsuru Hosoki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 14/375,828

(22) PCT Filed: Feb. 5, 2013

(86) PCT No.: PCT/JP2013/052588
§ 371 (c)(1),
(2) Date: Jul. 31, 2014

(87) PCT Pub. No.: WO2013/118712
PCT Pub. Date: Aug. 15, 2013

(65) Prior Publication Data
US 2015/0002751 A1    Jan. 1, 2015

(30) Foreign Application Priority Data

Feb. 8, 2012    (JP) .................................. 2012-024950

(51) Int. Cl.
*H04N 5/64* (2006.01)
*G02F 1/1333* (2006.01)
*G02F 1/133* (2006.01)
*H04N 5/655* (2006.01)

(52) U.S. Cl.
CPC ...... *G02F 1/133308* (2013.01); *G02F 1/13306* (2013.01); *H04N 5/655* (2013.01)

(58) Field of Classification Search
None
See application file for complete search history.

(56) References Cited

U.S. PATENT DOCUMENTS

| | | | | | |
|---|---|---|---|---|---|
| 4,721,365 | A | * | 1/1988 | Nishimura | ............ G02F 1/1345 29/593 |
| 5,982,468 | A | * | 11/1999 | Satou | .................. G02F 1/13452 349/150 |
| 6,160,605 | A | * | 12/2000 | Murayama | ............... G09G 3/20 349/149 |
| 2003/0179551 | A1 | * | 9/2003 | Sugimoto | .............. H05K 3/361 361/748 |
| 2004/0017534 | A1 | * | 1/2004 | Miki | ................. G02F 1/134336 349/143 |

FOREIGN PATENT DOCUMENTS

JP    2005-049450 A    2/2005

* cited by examiner

*Primary Examiner* — Jefferey Harold
*Assistant Examiner* — Humam Satti
(74) *Attorney, Agent, or Firm* — Keating & Bennett, LLP

(57) ABSTRACT

A display device includes a display device main body including a display panel provided on a circumferential portion thereof with an electrode unit and a dummy electrode unit, a chassis housing the display device main body, a source driver FPC configured to be electrically connected to the electrode unit and supply an electric signal to the display panel, and a flexible fixing board connected to the dummy electrode unit and fixed to the chassis.

16 Claims, 16 Drawing Sheets

DISPLAY DEVICE AND TELEVISION RECEPTION APPARATUS

TECHNICAL FIELD

The present invention relates to a display device and a television reception apparatus.

Priority is claimed on Japanese Patent Application No. 2012-024950, filed Feb. 8, 2012, the content of which is incorporated herein by reference.

BACKGROUND ART

Television reception apparatuses each housing a liquid crystal display panel and a backlight device in a chassis are conventionally known. Recently, screens of such television reception apparatuses have been increased in size. Additionally, for a purpose of reducing the overall size, it is a trend to narrower the width of a non-display region surrounding a display region, which is called a frame portion. Hereinafter, narrowing the width of the frame portion is occasionally called reduction in area of the frame portion. It is known to fix the liquid crystal display panel to part of the chassis of the television reception apparatus. Along with a further increase in size of screens and a further reduction in area of the frame portion, it becomes more difficult to firmly fix the liquid crystal display panel to the chassis.

Patent Document 1 below discloses a liquid crystal display device including a liquid crystal display panel and a backlight unit. In the case of the liquid crystal display device, a polarizer attached on the viewing side of the liquid crystal display panel is formed larger in size than the outer shape of a glass substrate. The liquid crystal display panel and the backlight unit are fixed such that a protruding portion of the polarizer, which protrudes from the glass substrate, is attached onto an upper surface of a frame.

CITATION LIST

Patent Document

[Patent Document 1] Japanese Patent Application Laid-Open Publication No. 2005-49450

DISCLOSURE OF THE INVENTION

Problems to be Solved by the Invention

A general configuration is such that a driving substrate, such as a source driver or a gate driver, is connected to a circumferential portion of the liquid crystal display panel. Accordingly, when the polarizer protrudes outward from the liquid crystal display panel as shown in the liquid crystal display device disclosed in Patent Document 1, the polarizer overlaps the driving substrate in some cases. Thus, there is a possibility of a failure to stably fix the liquid crystal display panel. Additionally, there is a possibility that the polarizer will be pealed from the glass substrate of the liquid crystal display panel when the liquid crystal display device is subject to impact. This problem is not limited to the liquid crystal display device, but is a problem common to an organic electroluminescence (hereinafter, simply referred to as "EL") display device, and a display device such as a plasma display.

The present invention has been made to solve the above problem and has an object to provide a display device having a structure such that a display panel can be firmly fixed.

Additionally, the present invention has an object to provide a television reception apparatus with high reliability including such a display device.

Means for Solving the Problems

To solve the above problem, a display device according to one aspect of the present invention includes: a display device main body including a display panel provided on a circumferential portion thereof with an electrode unit and a dummy electrode unit; a chassis housing the display device main body; a flexible print wiring board configured to be electrically connected to the electrode unit and supply an electric signal to the display panel; and a flexible fixing board connected to the dummy electrode unit and fixed to the chassis.

Regarding the display device according to one aspect of the present invention, the flexible print wiring board and the flexible fixing board are connected to one side of the display panel that is rectangular in shape.

Regarding the display device according to one aspect of the present invention, the flexible print wiring board and the flexible fixing board are connected to a side of the display panel which is extending in a longitudinal direction of the display panel.

Regarding the display device according to one aspect of the present invention, the flexible print wiring board and the flexible fixing board are connected to four sides of the display panel.

Regarding the display device according to one aspect of the present invention, along one side of the display panel, the flexible fixing board is disposed among a plurality of flexible print wiring boards including the flexible print wiring board.

Regarding the display device according to one aspect of the present invention, the flexible fixing board is disposed at a plurality of points along one side of the display panel.

Regarding the display device according to one aspect of the present invention, the electrode unit includes a plurality of electrodes, and the dummy electrode unit includes a plurality of dummy electrodes.

Regarding the display device according to one aspect of the present invention, the plurality of electrodes and the plurality of dummy electrodes are arranged at the same pitch.

Regarding the display device according to one aspect of the present invention, the chassis includes a first chassis and a second chassis, the first chassis covering the display device main body from a display surface side and exposing a display region of the display panel, and the second chassis covering the display device main body from a side opposite to the display surface side, and the flexible fixing board is sandwiched between the first chassis and the second chassis.

Regarding the display device according to one aspect of the present invention, any one of the first chassis and the second chassis is provided with a protruding portion protruding toward the other one of the first chassis and the second chassis, and the flexible fixing board is sandwiched between the protruding portion and the other one of the first chassis and the second chassis.

The display device according to one aspect of the present invention further includes a fixing member configured to fix the flexible fixing board to at least one of the first chassis and the second chassis.

Regarding the display device according to one aspect of the present invention, the fixing member is a fastening member, and the flexible fixing board is fixed to at least one of the first chassis and the second chassis while the fastening member is inserted into a hole provided in the flexible fixing board.

Regarding the display device according to one aspect of the present invention, the fixing member is an adhesive member, and the flexible fixing board is fixed via the adhesive member to at least one of the first chassis and the second chassis.

Regarding the display device according to one aspect of the present invention, the flexible fixing board is provided with a cutout portion, and any one of the first chassis and the second chassis is provided with a protruding portion at a position corresponding to that of the cutout portion, the protruding portion being fitted into the cutout portion.

Regarding the display device according to one aspect of the present invention, the display device main body includes: the display panel including a liquid crystal display panel; and a lighting system configured to emit light to the liquid crystal display panel.

A television reception apparatus according to one aspect of the present invention includes the display device of the present invention.

Effects of the Invention

According to the present invention, it is possible to implement a display device having a structure such that a display device can be firmly fixed.

According to the present invention, it is possible to implement a television reception apparatus with high reliability.

BEST MODE FOR CARRYING OUT THE INVENTION

[First Embodiment]

Hereinafter, a first embodiment of the present invention will be described with reference to FIGS. 1 to 10.

In the present embodiment, an example where a television reception apparatus using a liquid crystal display device is used as a display device is shown.

Figure 1:
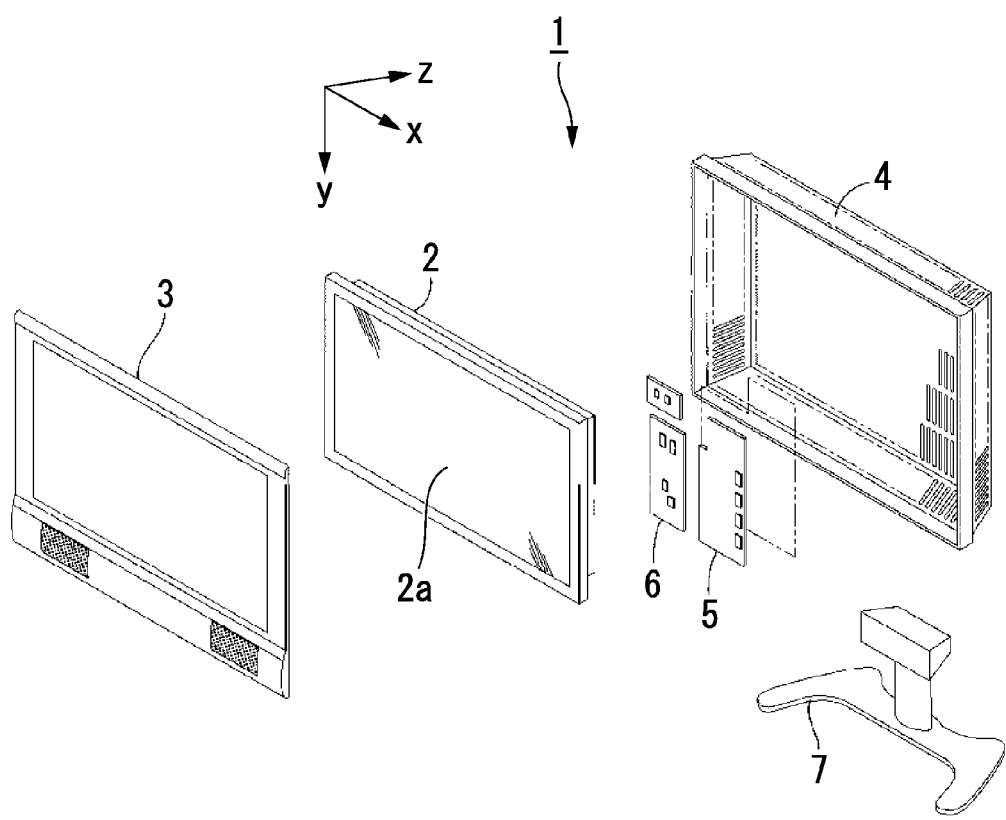
FIG. 1 is an exploded perspective view of a television reception apparatus of a first embodiment of the present invention.
Figure 2:
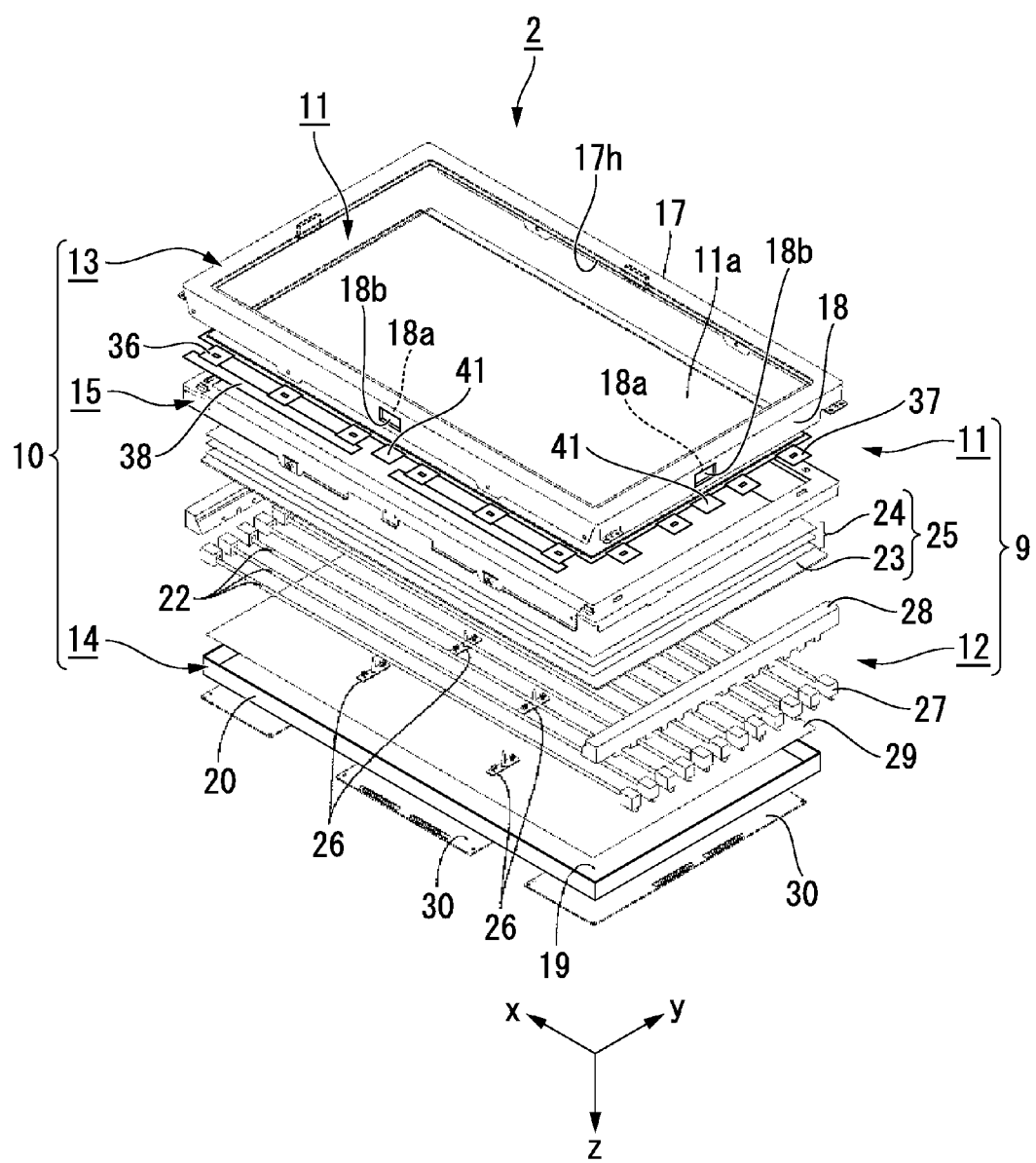
FIG. 2 is an exploded perspective view of a liquid crystal display device of the present embodiment.

FIG. 1 is an exploded perspective view of a television reception apparatus of the present embodiment. FIG. 2 is an exploded perspective view of the liquid crystal display device of the present embodiment.

Hereinafter, to improve visualization of each constituent element in each drawing, some constituent element is occasionally illustrated in different scales.

As shown in FIG. 1, the television reception apparatus 1 of the present embodiment includes a liquid crystal display device 2, a front cabinet 3, a rear cabinet 4, a power source 5, a tuner 6, and a stand 7. The liquid crystal display device 2 is housed in such a manner as to be sandwiched between the front cabinet 3 and the rear cabinet 4. The tuner 6 is used to receive a television broadcast or the like. The liquid crystal display device 2 is disposed in landscape orientation such that a display surface 2a is substantially parallel to the vertical direction at the time of use.

For the following descriptions, the display surface 2a side of the liquid crystal display device 2 is occasionally referred to as a front side or a viewing side, and the side opposite to the display surface 2a of the liquid crystal display device 2 is occasionally referred to as a rear side.

As shown in FIG. 2, the liquid crystal display device 2 includes a display device main body 9, and a chassis 10 for housing the display device main body 9. The display device main body 9 includes a liquid crystal display panel 11 and a backlight 12. The backlight 12 is a lighting system that emits light toward the liquid crystal display panel 11. The liquid crystal display panel 11 modulates, for each pixel, transmissivity of light emitted from the backlight 12 to form images, characters, and the like. The chassis 10 includes a bezel 13 (first chassis), a backlight chassis 14 (second chassis), and a frame 15 to be disposed between the bezel 13 and the backlight chassis 14.

The bezel 13 includes, for example, a metal plate. The bezel 13 includes a rectangular top plate portion 17 and a side plate portion 18 folded substantially vertically from the four outer-circumferential sides of the top plate portion 17. The bezel 13 is a lid-shaped member to cover an opening of the backlight chassis 14, which will be described later. The bezel 13 covers the liquid crystal display panel 11 from the display surface 11a side. Additionally, the top plate portion 17 is provided with an opening 17h through which a display region of the liquid crystal display panel 11 is to be exposed.

Figure 9:
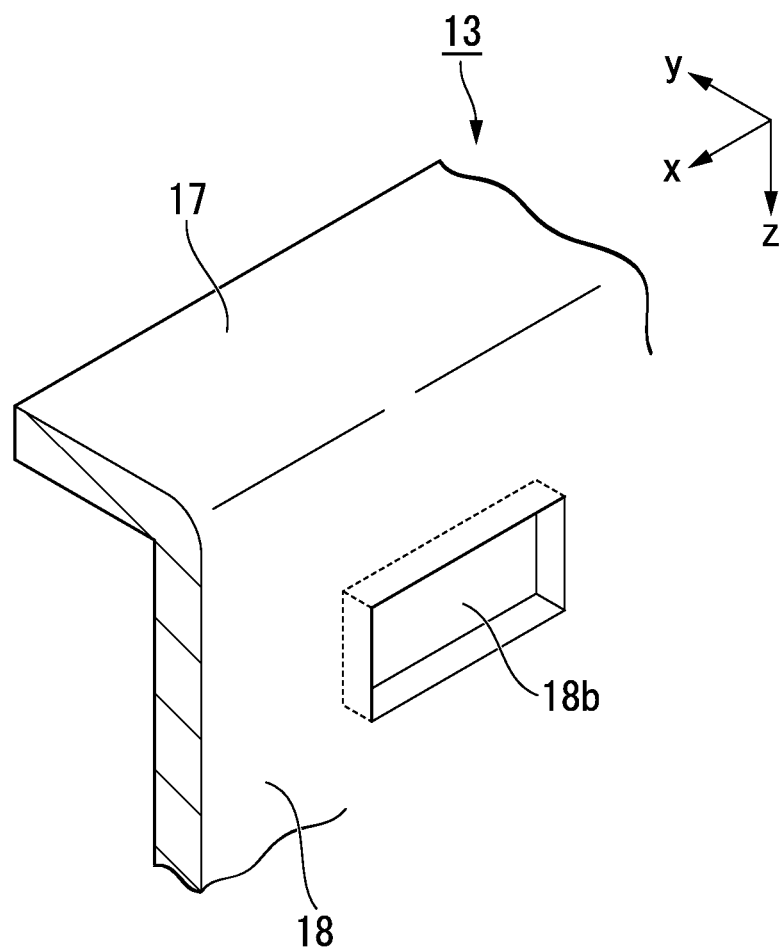
FIG. 9 is a perspective view of the fixing portion viewed from the outside of a bezel included in the chassis.

Each side plate portion 18 adjacent to one side of the top plate 17 has a protruding portion 18a protruding from the outside of the bezel 13 toward the inside thereof, which is formed at substantially the center of the side plate portion 18. The protruding portion 18a can be formed by sheet-metal processing at the time of forming the bezel 13. As shown in FIG. 9, the protruding portion 18a is a recessed portion 18b when the protruding portion 18a is viewed from the outside of the bezel 13. As will be described later, the protruding portion 18a is contributed to a fixing structure of the liquid crystal display panel 11 to the chassis 10.

The backlight chassis 14 includes, for example, a metal plate. The backlight chassis 14 is a box member including a rectangular bottom plate portion 19, and a side plate portion 20 extending substantially vertically upward from four outer-circumferential sides of the bottom plate portion 19. The backlight chassis 14 houses the backlight 12 therein and covers the display device main body 9 from the side opposite to the display surface 11a.

The frame 15 is, for example, a frame-shaped plastic member. The frame 15 is placed over the backlight chassis 14 such that the liquid crystal display panel 11 is sandwiched between the bezel 13 and the backlight chassis 14. By the above configuration, the display device main body 9 including the liquid crystal display panel 11 and the backlight 12 is housed in the inner space of the chassis 10 including the bezel 13, the frame 15, and the backlight chassis 14.

Next, the backlight 12 and the liquid crystal display panel 11, which are included in the display device main body 9, are described in detail.

The backlight 12 of the present embodiment is a backlight to be disposed on the rear surface side of the liquid crystal display panel 11, which is called a direct backlight. The backlight 12 includes a plurality of cold-cathode tubes 22, and an optical member 25 including a diffuser panel 23 and an optical sheet 24. For example, the cold-cathode tube 22, which is one of high-pressure discharge tubes, is used as a light source. Lights emitted from the plurality of cold-cathode tubes 22 reach the liquid crystal display panel 11 via the optical member 25. The cold-cathode tubes 22 are disposed so as to extend in substantially parallel to the long-side direction of the display device main body 9. The plurality of cold-cathode tubes 22 are disposed in the short-side direction of the display device main body 9, at a predetermined interval, in parallel to one another. Although an example where the cold-cathode tubes 22 are used as light sources is shown in the present embodiment, light emitting diodes (LED) may be used, in lieu of the cold-cathode tubes 22.

The backlight chassis 14 includes lamp clips 26, lamp holders 27, and holders 28. The lamp clips 26 are used to fix the cold-cathode tubes 22 to the bottom plate portion 19 of the backlight chassis 14. The lamp holders 27 are used to support end portions of the cold-cathode tubes 22. The holders 28 are used to collectively support the end portions of the plurality of cold-cathode tubes 22 and the lamp holders 27. The lamp clips 26, the lamp holders 27, and the holders 28 are, for example, white synthetic resin members. The cold-cathode tubes 22 are fixed by being attached onto the lamp clips 26, so that there is small space between each cold-cathode tube 22 and the bottom plate portion 19 of the backlight chassis 14. The both ends of each cold-cathode tube 22 are fitted into the lamp holders, and the lamp holders 28 are disposed so as to cover the lamp holders 27 from the side opposite to the bottom plate portion 19. The holder 28 is provided on the front surface thereof with a step portion (not shown) to place a diffuser plate 23 thereon.

A reflection sheet 29 is provided between the bottom plate 19 of the backlight chassis 14 and the plurality of cold-cathode tubes 22. The reflection sheet 29 is, for example, a white synthesis resin sheet with excellent light reflectivity. The reflection sheet 29 is disposed so as to be in close contact with the bottom plate portion 19. Thus, lights emitted from the plurality of cold-cathode tubes 22 toward the bottom plate portion 19 is reflected by the reflection sheet 29 and travel toward the optical member 25 side. The bottom plate portion 19 is provided on the rear surface side thereof with a control substrate 30. The control substrate 30 is used to control driving of the liquid crystal display panel 11.

The optical member 25 including the diffuser plate 23 and the optical sheet 24 is provided above the plurality of cold-cathode tubes 22. The diffuser plate 23 is a synthesis resin plate in which optical scattered particles are diffused. The diffuser plate 23 has a function of diffusing lights emitted from the cold-cathode tubes 22 as linear light sources, in a direction different from the extending direction of the cold-cathode tubes 22. Circumferential portions along the short sides of the diffuser plate 23 are placed on the step portions of the aforementioned holders 28. Circumferential portions along the long sides of the diffuser plate 23 are placed on the side plate portions 20 of the backlight chassis 14. The optical sheet 24 includes a laminate including a plurality of layered sheets. The plurality of sheets include a diffuser sheet, a lens sheet, and a reflective polarizer in this order from the diffuser plate 23 side. The optical sheet 24 has a function of converting lights output from the diffuser plate 23 into planar light. The frame 15 is disposed so as to be in direct contact with circumferential portions of the optical sheet 24.

Figure 3:
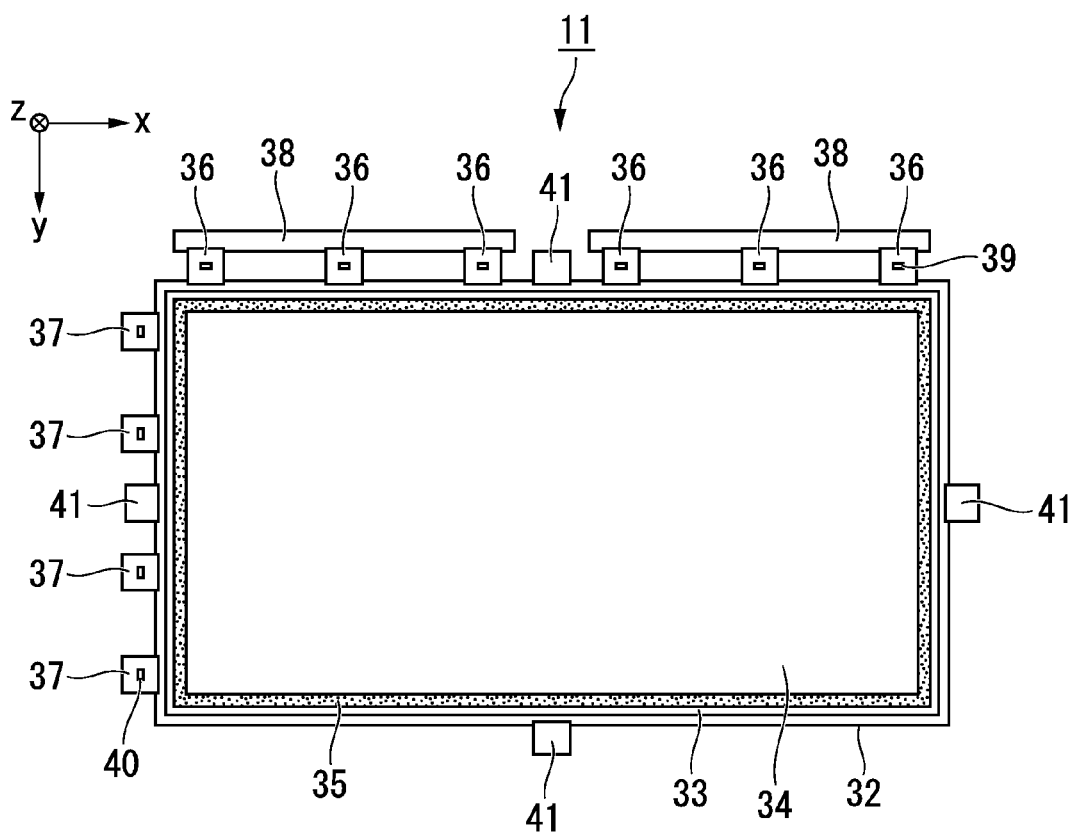
FIG. 3 is a plan view of a liquid crystal display panel of the present embodiment.

As shown in FIG. 3, the liquid crystal display panel 11 includes a TFT substrate 32, a color filter substrate 33, and a liquid crystal layer 34 sandwiched between the TFT substrate 32 and the color filter substrate 33. A reference numeral 35 is a seal member for attaching the color filter substrate 33 onto the circumferential portions of the TFT substrate 32. The liquid crystal display panel 11 is placed in the chassis 10 such that the TFT substrate 32 side faces the rear surface side, and the color filter substrate 33 side faces the front side.

The TFT substrate 32 is an active matrix substrate. The TFT substrate 32 is provided with a plurality of source lines (not shown) in a lengthwise direction shown in FIG. 3 and a plurality of gate lines (not shown) in a crosswise direction which cross under the plurality of source lines. A plurality of flexible printed wiring boards 36 for source drivers and a plurality of flexible printed wiring boards 37 for gate drivers are connected to the circumferential portions of the TFT substrate 32. Hereinafter, the flexible printed wiring boards (flexible printed circuits) are simply referred to as FPC. For the following descriptions, the plurality of flexible printed wiring boards 36 for source drivers are referred to as source driver FPCs 36, and the plurality of flexible printed wiring boards 37 for gate drivers are referred to as gate driver FPCs 37.

In the example of the present embodiment, six source driver FPCs 36 are connected to the upper side of the TFT substrate 32 shown in FIG. 3. Additionally, four gate driver FPCs 37 are connected to the left side of the TFT substrate 32 shown in FIG. 3. The six source driver FPCs 36 are arranged at a predetermined interval along the upper side of the TFT substrate 32. The four gate driver FPCs 37 are arranged at a predetermined interval along the left side of the TFT substrate 32. Regarding the source driver FPCs 36, one driver substrate 38 is connected to every three adjacent source driver FPCs 36. Regarding the gate driver FPCs 37, on the other hand, no driver substrate is connected to the gate driver FPCs 37. Here, a driver substrate may be connected to the gate driver FPCs 37.

The source driver FPC 36 includes a flexible base film such as polyimide, and a conductor such as a copper foil formed on the base film. The gate driver FPC 37 has a similar configuration as that of the source driver FPC 36. The source driver FPC 36 and the gate driver FPC 37 have the thickness of approximately 30 μm to 100 μm. On the other hand, the driver substrate 38 includes a rigid substrate made of glass epoxy or the like. The driver substrate 38 has the thickness of approximately 0.3 mm to 1.6 mm Each source driver FPC 36 and each gate driver FPC 37 are mounted respectively with driver LSI chips 39 and 40. The driver substrate 38 is mounted with various electronic components (not shown) contributed to driving of the liquid crystal display panel 11.

The flexible fixing boards 41 are connected to substantially centers of the respective sides of the TFT substrate 32. End portions of the flexible fixing boards 41, which are opposite to the sides connected to the TFT substrate 32, are fixed to the chassis 10 at the time of assembling, thus fixing the entire liquid crystal display panel 11 to the chassis 10. Since the source driver FPCs 36 are connected to the upper side of the TFT substrate 32 shown in FIG. 3, the flexible fixing board 41 is disposed between the two source driver FPCs 36 near the center of the upper side. Similarly, since the gate driver FPCs 37 are connected to the left side of the TFT substrate 32 shown in FIG. 3, the flexible fixing board 41 is disposed between the two gate driver FPCs 37 near the center of the left side. The flexible fixing board 41 includes a flexible film such as polyimide, similarly to the gate driver FPC 36 and the gate driver FPC 37.

Figure 4A:
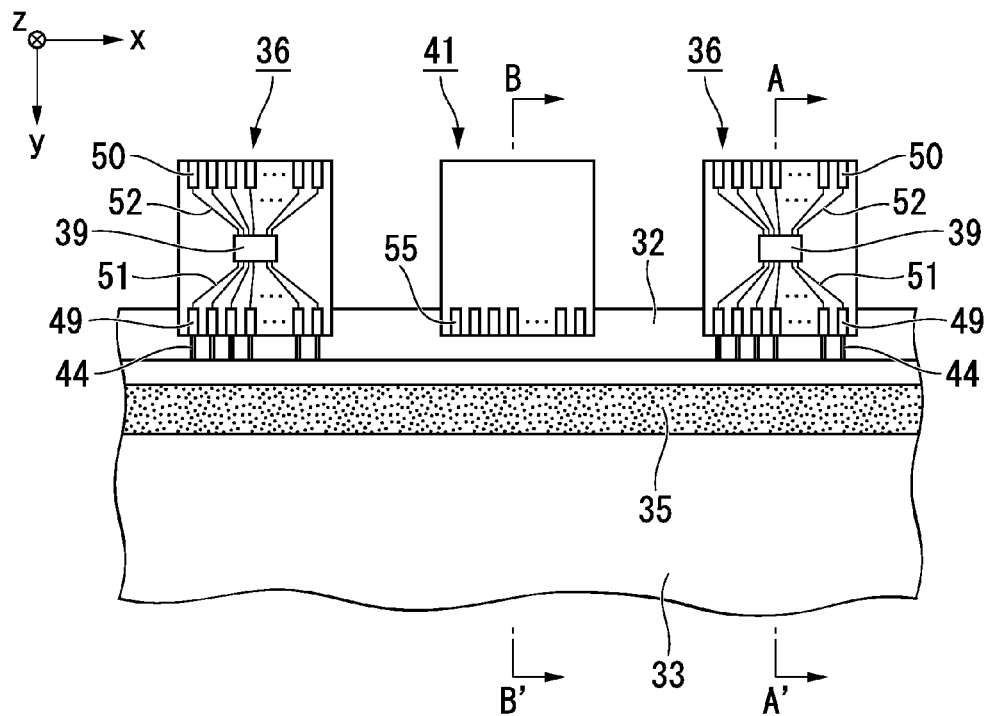
FIG. 4A is an enlarged plan view of a circumferential portion of the liquid crystal display panel.
Figure 4B:
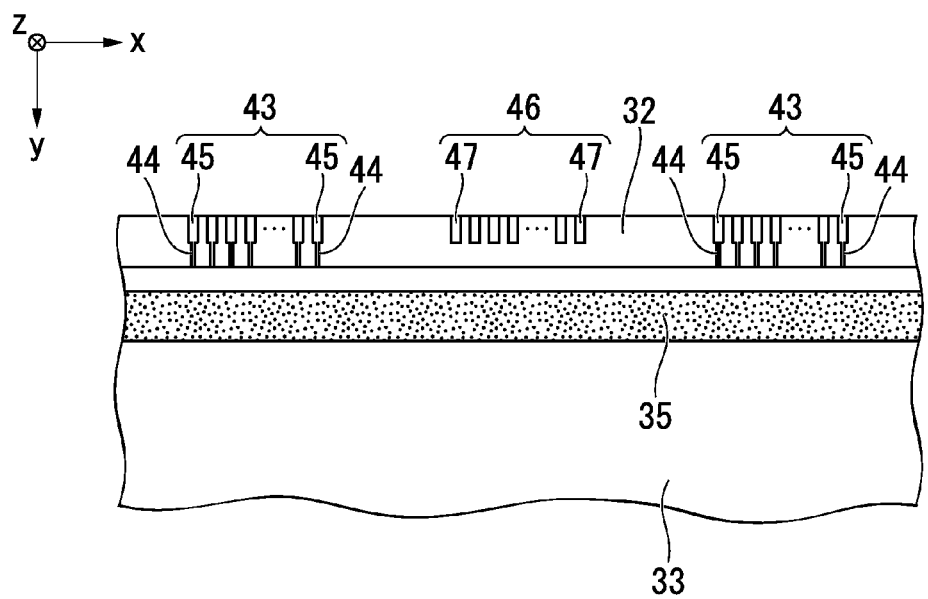
FIG. 4B is an enlarged plan view of the state where a source driver FPC and a flexible fixing board are detached from the liquid crystal display panel.
Figure 5:
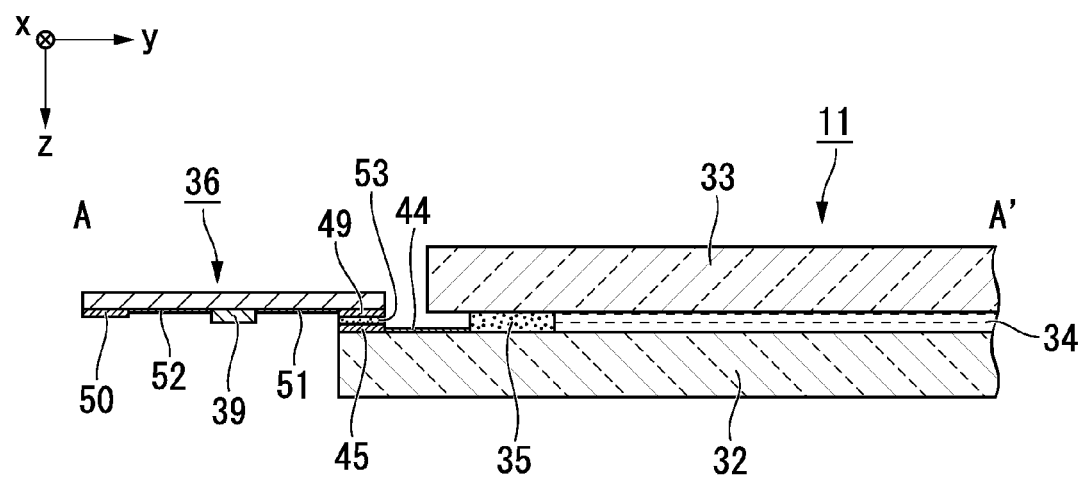
FIG. 5 is a cross-sectional view taken along a line A-A' shown in FIG. 4A.
Figure 6:
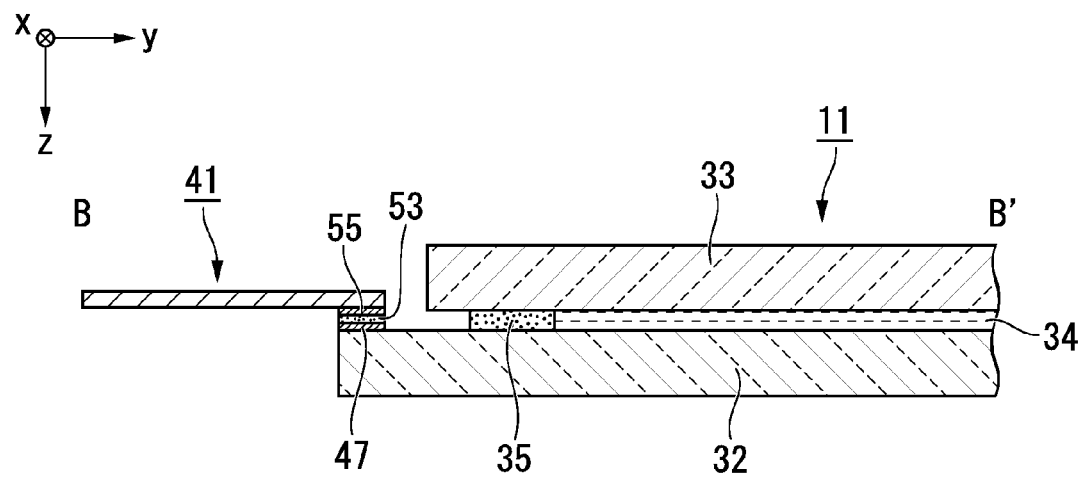
FIG. 6 is a cross-sectional view taken along a line B-B' shown in FIG. 4B.

FIGS. 4A and 4B are enlarged views illustrating a connecting portion of the flexile fixing board 41 and the adjacent source driver FPCs 36 with the TFT substrate 32. FIG. 4A illustrates a state after the flexible fixing board 41 and the source driver FPCs 36 are connected. FIG. 4B illustrates a state before the flexible fixing board 41 and the source driver FPCs 36 are connected. In FIG. 4A, illustration of the driver substrate 38 connected to the source driver FPCs 36 is omitted to improve visualization of the electrode portion. FIG. 5 is a cross-sectional view taken along a line A-A' shown in FIG. 4A. FIG. 6 is a cross-sectional view taken along a line B-B' shown in FIG. 4A.

The connecting portion on the source driver FPC side 36 has a similar configuration to that of the connecting portion on the gate driver FPC 37 side. For this reason, the configuration on the source driver FPC 36 side is taken here as an example to give a description.

As shown in FIG. 4B, the TFT substrate 32 is larger in outer shape than the color filter substrate 33. The circumferential portion of the TFT substrate 32 protrudes outward from the color filter substrate 33. A plurality of source electrode units 43 are provided on the protruding portion of the TFT substrate 32. One source electrode unit 43 includes a plurality of electrodes 45 respectively integrated with a plurality of source lines 44. In other words, one source electrode unit 43 includes a plurality of electrodes 45 arranged in parallel to one another, at a predetermined interval.

A dummy electrode unit 46 is provided between two adjacent source electrode units 43. The dummy electrode unit 46 is not electrically connected to any element and includes a plurality of dummy electrodes 47 arranged in parallel to one another, at a predetermined interval. In other words, the dummy electrode 47, although it is given a referential name "electrode", is a conductor unit not contributed to driving of the liquid crystal display panel 11.

The plurality of electrodes 45 included in the source electrode unit 43 and the plurality of dummy electrodes 47 included in the dummy electrode unit 46 are made of similar conductive material. Examples of such a conductive material include: a metal material such as Al (aluminum), Mo (molybdenum), Ti (titanium), or W (tungsten); or a transparent conductive material such as ITO (indium tin oxide) or IZO (indium zinc oxide). The pitch at which the plurality of electrodes 45 are arranged is the same as the pitch at which the plurality of dummy electrodes 47 are arranged. Accordingly, the difference between the electrode 45 and the dummy electrode 47 is whether or not those electrodes are connected to the source lines 44.

As shown in FIGS. 4A and 5, the source driver FPC 36 is provided on one end thereof with a plurality of first electrode 49 to be connected respectively to a plurality of electrodes 45 on the TFT substrate 32. The source driver FPC 36 is provided on the other end thereof with a plurality of second electrodes 50 to be connected to the driver substrate 38. The source driver FPC 36 is provided on one surface thereof with a plurality of first wires 51 each connecting a driver LSI chip 39 and one of the first electrodes 49, and a plurality of second wires 52 each connecting the driver LSI chip 39 and one of the second electrodes 50. The electrode 45 on the TFT substrate 32 is bonded to the first electrode 49 on the source driver FPC 36 by thermal compression using a known anisotropic conductive material 53, such as anisotropic conductive film (ACF) or anisotropic conductive paste (ACP). Although not shown in FIGS. 4A and 5, an electrode on the driver substrate 38 is bonded to the second electrode 50 on the source driver FPC 36 by thermal compression using known anisotropic conductive material, such as ACF and ACP, similarly to the connecting structure on the first electrode 49 side.

As shown in FIGS. 4A and 6, the flexible fixing board 41 is provided on one end thereof with a plurality of dummy electrodes 55 to be connected to the plurality of dummy electrodes 47 on the TFT substrate 32. The plurality of dummy electrodes 55 include conductor such as a copper foil formed on a base film such as polyimide. The dummy electrode 47 on the TFT substrate 32 is bonded to the dummy electrode 55 on the flexible fixing board 41 by thermal compression using known anisotropic conductive material, such as ACF and ACP, similarly to the connecting structure on the source driver FPC 36 side.

Figure 7:
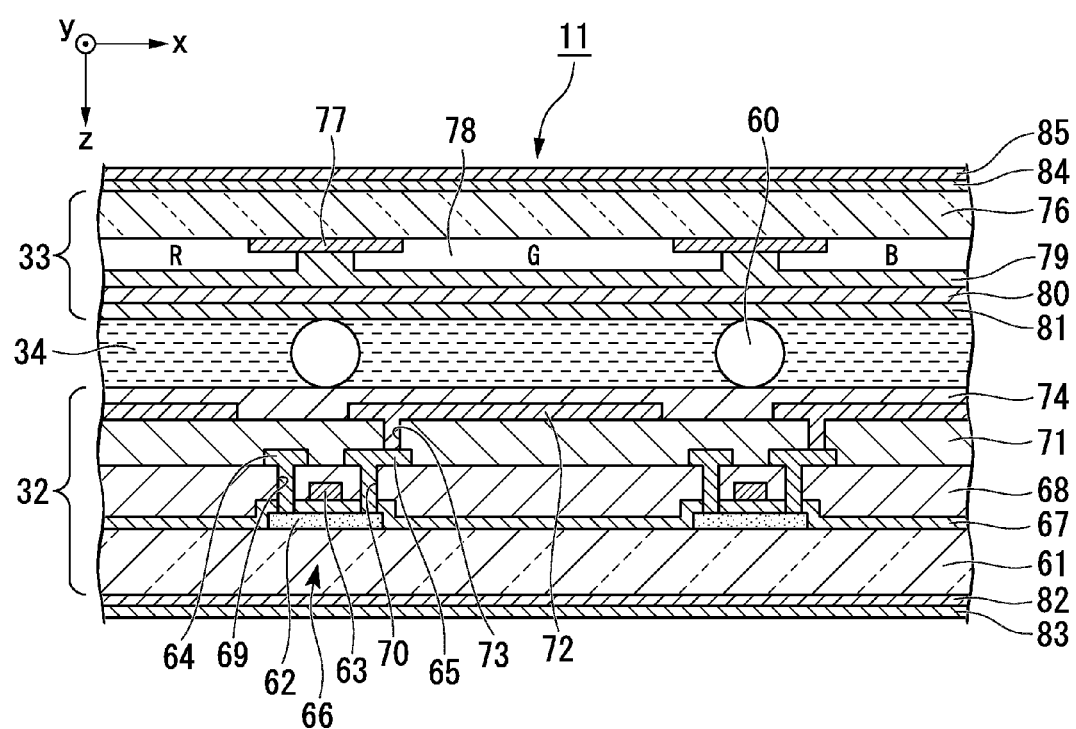
FIG. 7 is a cross-section view illustrating a detailed configuration of the liquid crystal display panel.

FIG. 7 is a vertical cross-sectional view of the liquid crystal display panel 11.

As shown in FIG. 7, the liquid crystal display panel 11 includes a TFT substrate 32 as a switching element substrate, a color filter substrate 33 disposed so as to opposing the TFT substrate 32, and a liquid crystal layer 34 sandwiched between the TFT substrate 32 and the color filter 33. The liquid crystal layer 34 is provided in space surrounded by the TFT substrate 32, the color filter substrate 33, and a seal material 35 sticking the TFT substrate 32 and the color filter substrate 33 at a predetermined interval (see FIGS. 4A and 4B).

The liquid crystal panel 11 is used to perform displaying in a vertical alignment (VA) mode. A vertical alignment liquid crystal with negative dielectric constant anisotropy is used for the liquid crystal layer 34. A spherical spacer 60 is disposed between the TFT substrate 32 and the color filter substrate 33 to keep the interval therebetween constant. Here, as the display mode, not only the above VA mode, but also a twisted nematic (TN) mode, a super twisted nematic (STN) mode, an in-plane switching (IPS) mode, or the like, can be used.

The TFT substrate 32 is provided thereon with a plurality of pixels (not shown) in a matrix, which are the minimum unit display regions. The TFT substrate 32 is provided thereon with a plurality of source lines (not shown) extending in parallel to one another and a plurality of gate lines (not shown) extending in parallel to one another and vertically crossing the plurality of source lines. Accordingly, the plurality of source lines and the plurality of gate lines are formed in a matrix on the TFT substrate 32. A rectangular region defined by two adjacent source lines and two adjacent gate lines becomes one pixel. The source line is connected to the TFT source electrode that will be described later. Additionally, the gate line is connected to the TFT gate electrode.

A TFT 66 including a semiconductor layer 62, a gate electrode 63, a source electrode 64, a drain electrode 65, and the like is formed on a surface, on the liquid crystal layer 34 side, of a transparent substrate 61 constituting the TFT substrate 32. An example of the transparent substrate 61 includes a glass substrate. The semiconductor layer 62 including semiconductor materials, such as continuous grain silicon (CGS), low-temperature poly-silicon (LPS), and amorphous silicon (α-Si), is formed on the transparent substrate 61.

A gate insulating film 67 is formed on the transparent substrate 61 so as to cover the semiconductor layer 62. Examples of a material of the gate insulating film 67 include a silicon oxide film, a silicon nitride film, or a laminate film including those films layered. A gate electrode 63 is formed on the gate insulating film 67 so as to oppose the semiconductor layer 62. Examples of a material of the gate electrode 63 include a laminate film including tungsten (W) and tantalum nitride (TaN), molybdenum (Mo), titanium (Ti), aluminum (Al), or the like.

A first inter-later insulating film 68 is formed over the gate insulating film 67 so as to cover the gate electrode 63. Examples of a material of the first inter-later insulating film 68 include a silicon oxide film, a silicon nitride film, or a laminate film including those films layered. A source electrode 64 and a drain electrode 65 are formed over the first inter-layer insulating film 68. The source electrode 64 is connected to a source region of the semiconductor layer 62 via a contact hole 69 penetrating the first inter-layer insulating film 68 and the gate insulating film 67. Similarly, the drain electrode 65 is connected to a drain region of the semiconductor layer 62 via a contact hole 70 penetrating the first inter-layer insulating film 68 and the gate insulating film 67. Examples of the source electrode 64 and the drain electrode 65 include a conductive material similar to that of the aforementioned gate electrode 63. A second inter-layer insulating film 71 is formed over the first inter-layer insulating film 68 so as to cover the source electrode 64 and the drain electrode 65. Examples of a material of the second inter-layer insulating film 71 include a material similar to that of the aforementioned first inter-layer insulating film 68, or an organic insulating material.

A pixel electrode 72 is formed over the second inter-layer insulating film 71. The pixel electrode 72 is connected to the drain electrode 65 via a contact hole 73 penetrating the second inter-layer insulating film 71. Therefore, the pixel electrode 72 is connected to the drain region of the semiconductor layer 62 via the drain electrode 65 serving as a relay electrode. Examples of a material of the pixel electrode 72 include a transparent conductive material, such as ITO or IZO.

By this configuration, a scan signal is supplied through the gate line. When the TFT 66 enters the on-state, an image signal supplied via the source line to the source electrode 64 is supplied to the pixel electrode 72 via the semiconductor layer 62 and the drain electrode 65. Additionally, an alignment film 74 is formed over the entire second inter-layer insulating film 71 so as to cover the pixel electrode 72. The alignment film 74 has an alignment regulating force of vertically aligning liquid crystal molecules constituting the liquid crystal layer 34. The TFT 66 may be embodied as a top gate TFT as shown in FIG. 7 or a bottom gate TFT.

On the other hand, a black matrix 77, a color filter 78, a planarizing layer 79, an opposite electrode 80, and an alignment film 81 are sequentially formed on a surface, on the liquid crystal layer 34 side, of the transparent substrate 76 included in the color filter substrate 22. The black matrix 77 has a function of blocking light from transmitting therethrough in inter-pixel regions. The black matrix 77 is made of metal such as chromium or a multi-layered film including Cr and chromium oxide, or a photoresist formed by diffusing carbon particles in photosensitive resin.

The color filter 78 contains the dye of red (R), green (G), and blue (B). Any one of the R, G, and B color filters 78 is disposed so as to oppose one pixel electrode 72 on the TFT substrate 32. The planarizing layer 79 includes an insulating film covering the black matrix 77 and the color filter 78. The planarizing layer 79 has a function of reducing and thereby planarizing a step generated by the black matrix 77 and the color filter 78. An opposite electrode 80 is formed over the planarizing layer 79. Examples of a material of the opposite electrode 80 include a transparent conductive material, similar to that of the pixel electrode 72. Additionally, an alignment film 81 having the vertical alignment regulating force is formed over the entire opposite electrode 80. The color filter 78 may contain multiple colors including at least three colors, R, G, and B.

A first phase difference plate 82 and a first polarizing plate 83 functioning as a polarizer are sequentially provided on a surface (external surface) opposite to the liquid crystal layer 34 side of the TFT substrate 32. A second phase difference plate 84 and a second polarizing plate 85 functioning as a polarizer are sequentially provided on a surface (external surface) of the color filter substrate 33 which is opposite to the liquid crystal layer 34 side.

Next, a structure of fixing the liquid crystal display panel 11 to the chassis 10, which is one of characteristic points of the present embodiment, will be described with reference to FIGS. 8 to 10.

Figure 8:
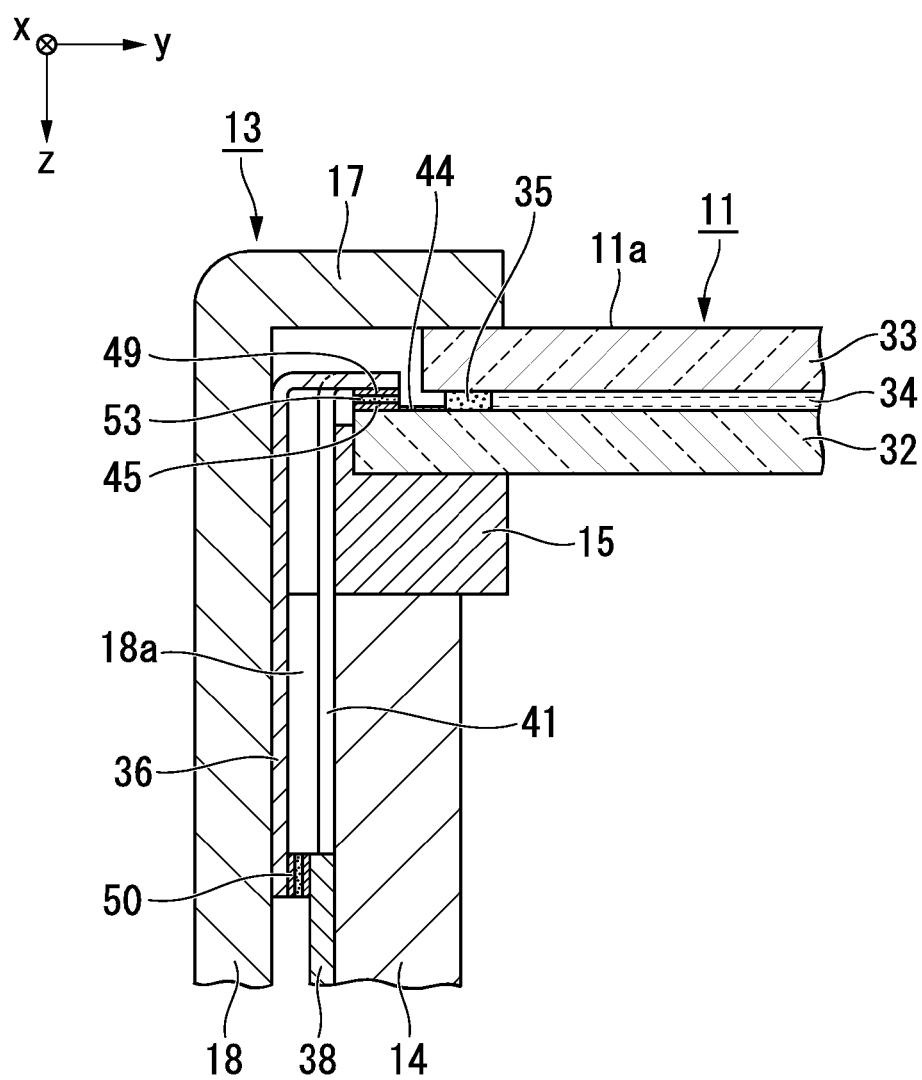
FIG. 8 is an enlarged cross-section view illustrating a fixing portion of the liquid crystal display panel.

FIG. 8 is an enlarged cross-sectional view illustrating a fixing portion of the liquid crystal display panel 11 on a side where the source driver FPCs 36 are provided. FIG. 9 is a perspective view of the fixing portion viewed from the outside of the bezel 13. FIG. 10 is a perspective view of the fixing portion viewed from the inside of the bezel 13, in a state where the bezel 13 is detached upward. To improve visualization of FIG. 10, the liquid crystal display panel 11 connected to the source driver FPC 36 and the flexible fixing board 41 is illustrated by virtual lines (dashed-dotted lines). Additionally, illustration of the frame 15 is omitted in FIG. 10.

A fixing structure on the source driver FPC 36 side is similar to the fixing structure on the gate driver FPC 37 side. For this reason, the fixing structure on the source driver FPC 36 side is taken here as an example description to given a description.

The liquid crystal display panel 11 is sandwiched between the bezel 13 and the frame 15, as shown in FIG. 8. More specifically, the circumferential portion of the liquid crystal display panel 11 is sandwiched between the bezel 13 and the frame 15 in such a manner that the color filter substrate 33 contacts a lower surface of the top plate portion 17 of the bezel 13, and the TFT substrate 32 contacts the upper surface of the frame 15. As described above, each side plate portion 18 of the bezel 13 is provided with the protruding portion 18a protruding inward from the bezel 13, as shown in FIG. 10. The height of the protruding portion 18a (dimension in the protruding direction) is set to be larger than a sum of the thickness of the source driver FPC 36 and the thickness of the driver substrate 38. The protruding portion 18a is a recessed portion 18b when the protruding portion 18a is viewed from the outside of the bezel 13, as shown in FIG. 9. The position of the protruding portion 18a is substantially the center of the side plate portion 18 and corresponds to the position at which the flexible fixing board 41 connected to the liquid crystal display panel 11 is provided.

Figure 10:
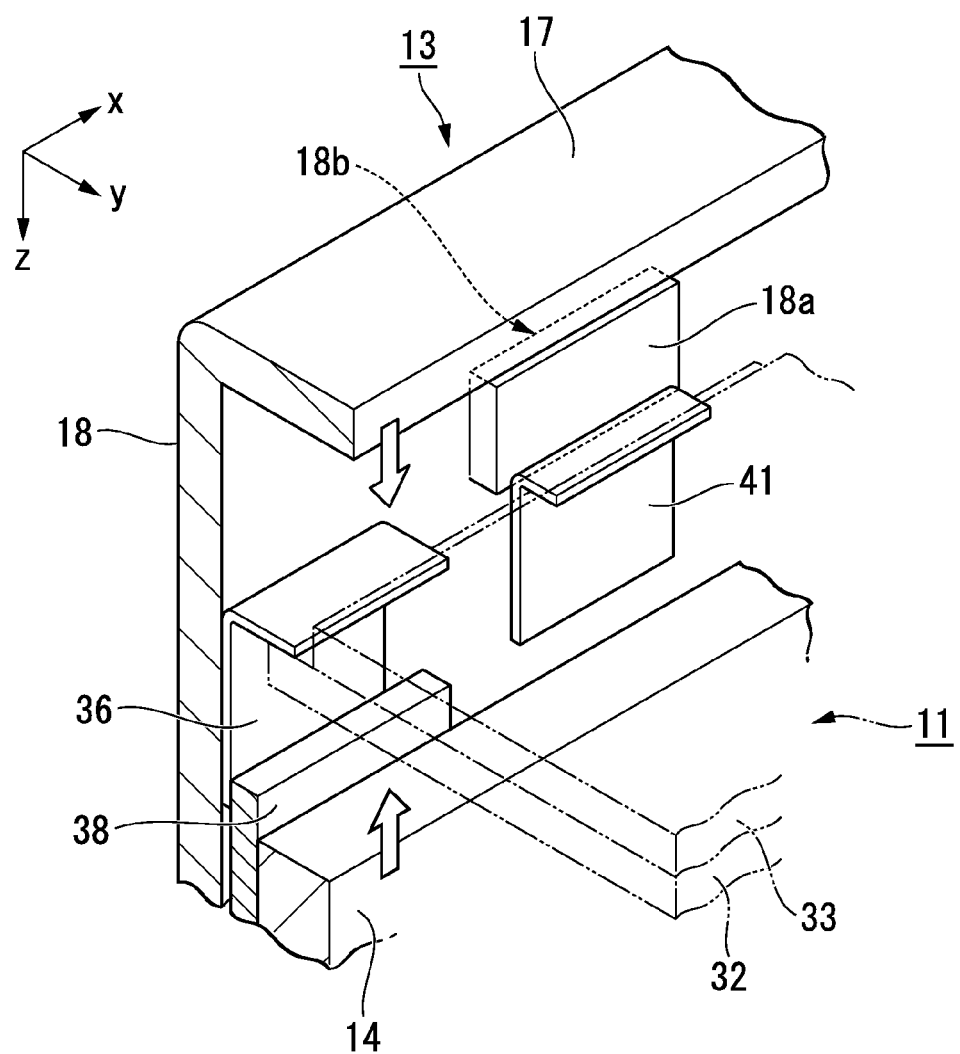
FIG. 10 is an exploded perspective view of the fixing portion viewed from the inside of the bezel.

As shown in FIGS. 8 and 10, an end portion of the flexible fixing board 41, which is opposite to the side connected to the liquid crystal display panel 11, is folded in a direction substantially vertical to the display surface 11a of the liquid crystal display panel 11, and is tightly sandwiched between the protruding portion 18a of the bezel 13 and the backlight chassis 14. To tightly sandwich the flexible fixing board 41 therebetween, it is preferable that the protruding portion 18a of the bezel 13 and the backlight chassis 14 tightly attract each other such the bezel 13 and the backlight chassis 13 pushes each other by their elastic force.

Another end portion of the source driver FPC 36 on a side connected to the driver substrate 38 is folded in a direction vertical to the display surface 11a of the liquid crystal display panel 11 and is housed together with the driver substrate 38 in space between the side plate portion 18 of the bezel 13 and the backlight chassis 14. Although not shown in FIGS. 8 and 10, various electronic components mounted on the driver substrate 38 are further housed in the space between the side plate portion 18 of the bezel 13 and the backlight chassis 14. In a case where the bezel 13 is made of a conductive material such as metal, it is preferable to insert an insulating sheet between the bezel 13 and the electronic component in order to avoid electric short-circuit between the bezel 13 and the electronic component.

In the liquid crystal display device 2 of the present embodiment, the liquid crystal display panel 11 is sandwiched between the bezel 13 and the frame 15 along the four sides of the circumferential portion of the liquid crystal display panel 11, thus being fixed to the chassis 10. However, only the fixation by the bezel 13 and the frame 15 is not sufficient. For example, when shock is applied from the rear surface toward the front surface of the liquid crystal display device 2, the liquid crystal display panel 11 might be detached from the chassis 10. Particularly for a rectangular liquid crystal display panel 11, there is a high likelihood that the liquid crystal display panel 11 will be detached from the chassis 10 at a position close to the center of the long side. Additionally, as the frame of the liquid crystal display panel 11 is narrower, the area of the portion sandwiching the liquid crystal display panel 11 between the bezel 13 and the frame 15 decreases. In that case, the force fixing the liquid crystal display panel 11 decreases, the above problem becomes remarkable. The above problem can be improved if the area of the portion sandwiching the liquid crystal display panel 11 between the bezel 13 and the frame 15 is increased. However, this is opposite to a reduction in area of the frame portion.

In the liquid crystal display device 2 of the present embodiment, on the other hand, the circumferential portion of the liquid crystal display panel 11 is sandwiched between the bezel 13 and the frame 15. Further, the flexible fixing boards 41 connected to the center portions of the four respective sides of the liquid crystal display panel 11 are sandwiched between the protruding portion 18a of the bezel 13 and the backlight chassis 14. Accordingly, in the liquid crystal display device 2 of the present embodiment, the liquid crystal display panel 11 is more firmly fixed to the chassis 10 than in the conventional liquid crystal display device without a fixing structure using this type of flexible fixing board. Consequently, there is less likelihood that the liquid crystal display panel 11 will be detached from the chassis 10 even when shock is applied, thereby making it possible to provide a liquid crystal display device with excellent impact resistance.

Additionally, since the liquid crystal display device 2 of the present embodiment has the fixing structure using the flexible fixing board 41, tensile stress, which is applied to the source driver FPC 36 and the gate driver FPC 37 when shock is applied, diffuses in the flexible fixing board 41 and thereby decreases. For this reason, defects, such as disconnection of wires for the source driver FPC 36 and the gate driver FPC 37, disconnection of wires each connecting an electrode and the liquid crystal display panel 11, and pealing of the electrode connecting portions, become less likely to occur. Consequently, it is possible to enhance the reliability of the liquid crystal display device.

In the liquid crystal display device 2 of the present embodiment, the structure of fixing the flexible fixing board 41 and the liquid crystal display panel 11 is substantially the same as the structure of fixing the liquid crystal display panel 11 to the source driver FPC 36 and the gate driver FPC 37. In other words, the liquid crystal display panel 11 is provided on the circumferential portion thereof with the plurality of electrode units 43 each including the plurality of electrodes 45 and the plurality of dummy electrode units 46 each including the plurality of dummy electrodes 47 arranged at the same pitch as that of the plurality of electrodes 45. Additionally, the electrodes on the source driver FPC 36 and the gate driver FPC 37 are bonded to the electrodes 45 on the liquid crystal display panel 11 by thermal compression with the anisotropic conductive material 53. Further, the dummy electrodes 55 on the flexible fixing board 41 are bonded to the dummy electrodes 55 on the liquid crystal display panel 11 by thermal compression with the anisotropic conductive material 53.

Accordingly, even if the flexible fixing board 41, which is a fixing member not used conventionally, is used, a process of mounting the flexible fixing board 41 and a process of mounting the source driver FPC 36 and the gate driver FPC 37 can be simultaneously performed, thereby causing no increase in the number of processes included in the manufacturing process. As a matter of course, it is necessary to prepare the flexible fixing board 41, but the flexible fixing board 41 can be manufactured separately from the process of manufacturing the liquid crystal display device 2. Additionally, it is necessary to form the dummy electrode units 46 on the TFT substrate 32, but this formation process can be implemented only by changing the design of a photomask used for the formation of the electrode units. As a result, it is possible to provide, without decreasing the productivity, a liquid crystal display device with excellent impact resistance and excellent reliability and a television reception apparatus including that liquid crystal display device.

In the liquid crystal display device 2 of the present embodiment, the example where the flexible fixing board 41 is provided for each of the four sides of the liquid crystal display panel 11 has been shown. However, in a case where there is no likelihood that the liquid crystal display panel 11 will be detached from the chassis 10 along the short side of the liquid crystal display panel 11, it is not necessary to provide the flexible fixing board 41 along the short side of the liquid crystal display panel 11, as long as the flexible fixing board 41 is provided at least along the long side of the liquid crystal display panel 11.

[Second Embodiment]

Hereinafter, a second embodiment of the present invention will be described with reference to FIG. 11.

A liquid crystal display device of the present embodiment has a basic configuration similar to that of the first embodiment and differs therefrom only in arrangement of the source driver FPC and the gate driver FPC. Therefore, in the present embodiment, a description of the basic configuration of the liquid crystal display device is omitted, and the arrangement of the source driver FPC and the gate driver FPC is described.

Figure 11:
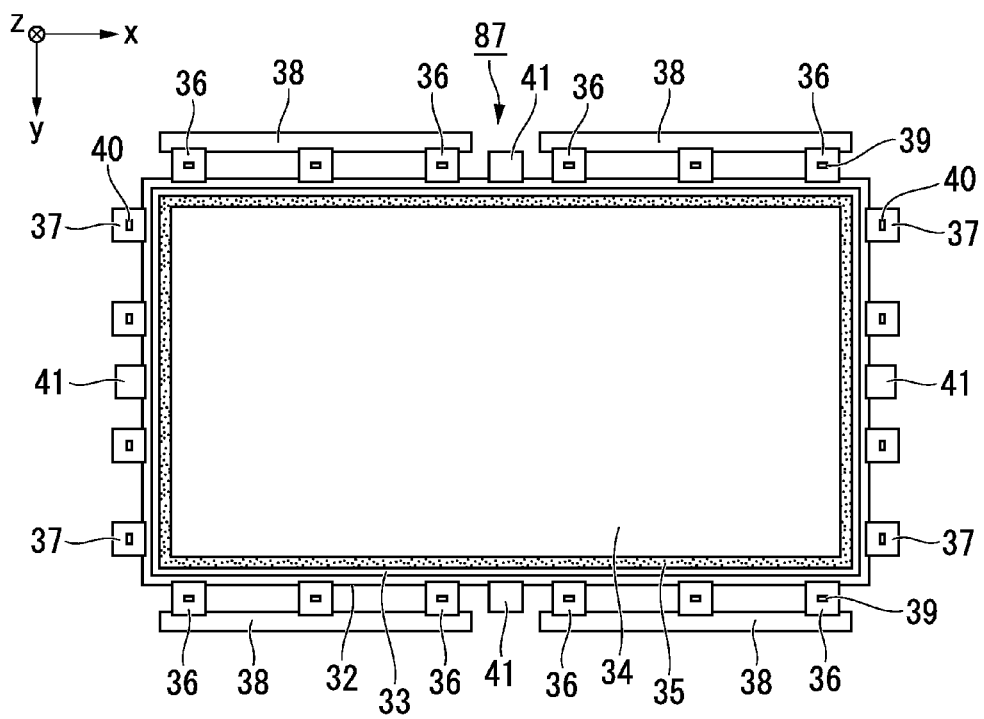
FIG. 11 is a plan view illustrating a liquid crystal display panel of a second embodiment of the present invention.

FIG. 11 is a plan view of a liquid crystal display panel of the present embodiment. In FIG. 11, the same reference numerals are appended to constituent elements common to those shown in FIG. 3 referred to in the first embodiment, and a description thereof is omitted here.

In the liquid crystal display panel 11 of the first embodiment, the electrode units are provided only on the two sides, the upper and left sides, of the circumferential portion of the TFT substrate 32. In a liquid crystal display panel 87 of the present embodiment, the electrode units are provided on all the four sides of the circumferential portion of the TFT substrate 32. In other words, in the liquid crystal display panel 87 of the present embodiment, source lines are drawn to the upper and lower sides of the TFT substrate 32, and the electrode units each including a plurality of electrodes are provided, as shown in FIG. 11. A plurality of source driver FPCs 36 are connected respectively to the electrode units on the upper and lower sides of the TFT substrate 32. Gate lines are drawn respectively to the left and right sides of the TFT substrate 32 and a plurality of electrode units each including a plurality of electrodes are provided. The plurality of gate driver FPCs 37 are connected respectively to the electrode units on the left side and the electrode units on the right side.

In the example of the present embodiment, six source driver FPCs 36 are connected equally to both the upper and lower sides of the TFT substrate 32 shown in FIG. 11. Additionally, four gate driver FPCs 37 are connected equally to both the left and right sides of the TFT substrate 32 shown in FIG. 11. The six source driver FPCs 36 are arranged at a predetermined interval along the upper and lower sides of the TFT substrate 32. The four gate driver FPCs 37 are arranged at a predetermined interval along the left and right sides of the TFT substrate 32. Regarding the source driver FPC 36, one driver substrate 38 is connected to every three adjacent source driver FPCs 26. Regarding the gate driver FPC 37, on the other hand, no driver substrate 38 is connected thereto. Here, the driver substrate 38 may be connected to the gate driver FPC 37.

The flexible fixing board 41 is connected to substantially the center of each side of the TFT substrate 32. On the upper and lower sides of the TFT substrate 32 shown in FIG. 11, the flexible fixing board 41 is disposed between the two adjacent source drivers FPCs 36 close to the center. On the left and right sides of the TFT substrate 32 shown in FIG. 11, the flexible fixing board 41 is disposed between the two adjacent gate drivers FPCs 37 close to the center.

Other configurations are similar to those of the first embodiment.

Also in the present embodiment, it is possible to provide, without decreasing the productivity, a liquid crystal display device with excellent impact resistance and excellent reliability, which is a similar effect to that can be achieved in the first embodiment.

In the case of the first embodiment, it is necessary to provide dummy electrode units even to a side where no electrode unit is provided, and therefore design modification occasionally requires a bit more effort. In the case of the present embodiment, on the other hand, it is necessary to provide dummy electrode units only to a side where an electrode unit has been already provided, thereby achieving a merit such that less effort is required for the design modification.

[Third Embodiment]

Hereinafter, a third embodiment of the present invention will be described with reference to FIG. 12.

A liquid crystal display device of the present embodiment has a basic configuration similar to that of the first embodiment and differs therefrom only in arrangement of the flexible fixing boards. Therefore, in the present embodiment, a description of the basic configuration of the liquid crystal display device is omitted, and the arrangement of the flexible fixing boards is described.

Figure 12:
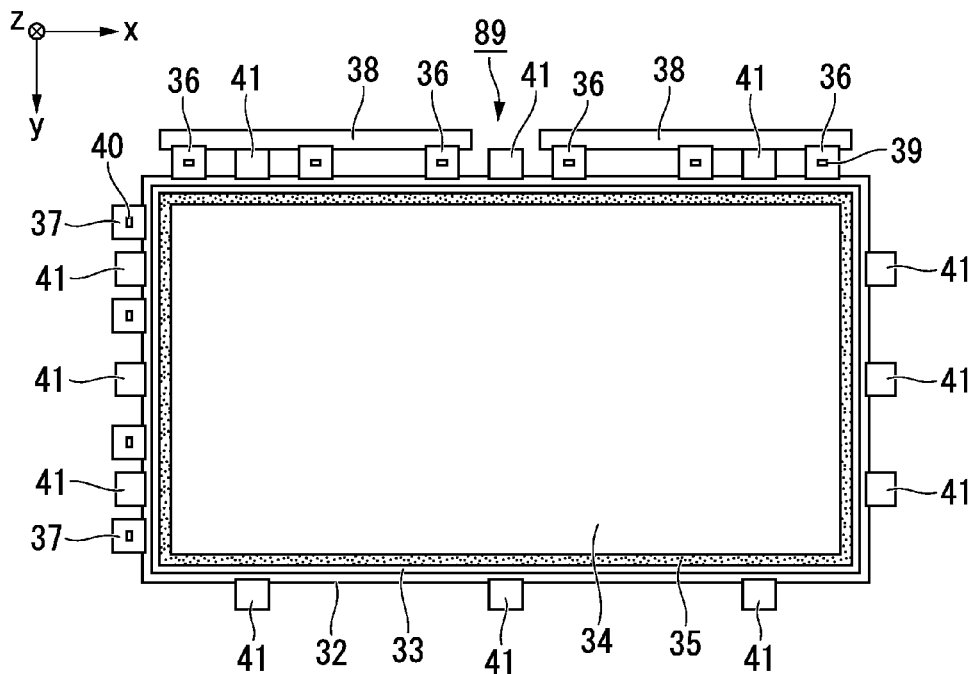
FIG. 12 is a plan view illustrating a liquid crystal display panel of a third embodiment of the present invention.

FIG. 12 is a plan view of a liquid crystal display panel of the present embodiment. In FIG. 12, the same reference numerals are appended to constituent elements common to those shown in FIG. 3 referred to in the first embodiment, and description thereof is omitted here.

In the liquid crystal display panel 11 of the first embodiment, the flexible fixing board 41 is provided only at the center point of each side of the circumferential portion of the TFT substrate 32. In a liquid crystal display panel 89 of the present embodiment, the flexible fixing board 41 is provided not only at the center point of each side of the circumferential portion of the TFT substrate 32, but also at points relatively close to both ends of each side thereof, as shown in FIG. 12. In other words, three flexible fixing boards 41 are provided on each side of the TFT substrate 32. It seems in FIG. 12 that the flexible fixing boards 41 on the both ends side of the upper side of the TFT substrate 32 contact the driver substrate 38, but are not connected to the driver substrate 38.

Other configurations are similar to those of the first embodiment.

Also in the present embodiment, it is possible to provide, without decreasing the productivity, a liquid crystal display device with excellent impact resistance and excellent reliability, which is a similar effect to that can be achieved in the first embodiment. In the case of the present embodiment, the number of flexible fixing boards 41 is increased compared to that in the first embodiment, thereby making it possible to more firmly fixing the liquid crystal display panel 89 to the chassis. Particularly, the additional flexible fixing boards 41 are provided at points close to both ends of each side, thereby making the structure more resistant to pealing of portions, close to the corners, of the liquid crystal display panel. Additionally, the configuration of the present embodiment is also suitable to a large liquid crystal display panel.

[Fourth Embodiment]

Hereinafter, a fourth embodiment of the present invention will be described with reference to FIGS. 13 and 14.

A liquid crystal display device of the present embodiment has a basic configuration similar to that of the first embodiment and differs therefrom only in the configuration of the flexible fixing board and the fixing structure. Therefore, in the present embodiment, a description of the basic configuration of the liquid crystal display device is omitted, and the configuration of the flexible fixing board and the fixing structure are described.

Figure 13:
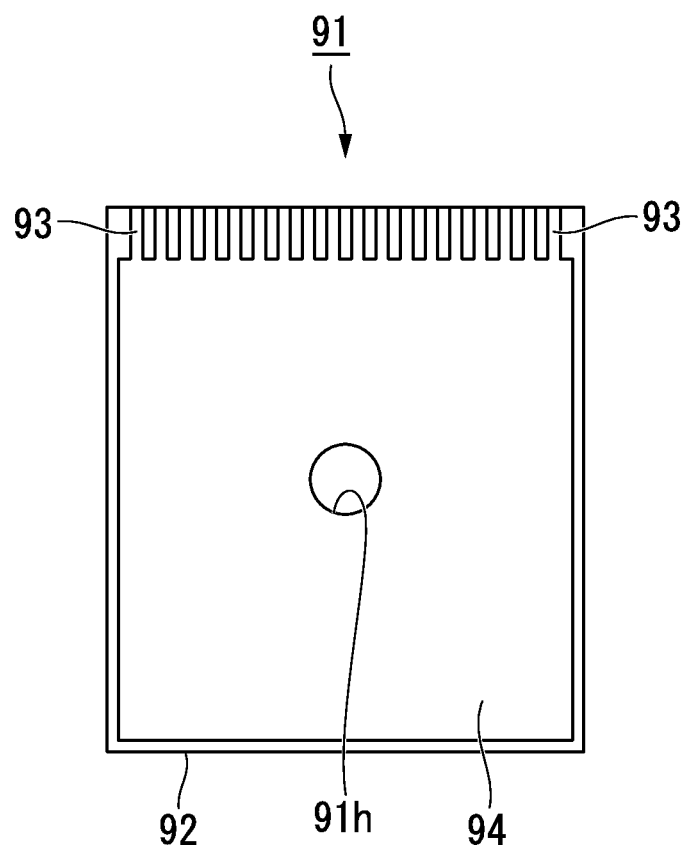
FIG. 13 is a plan view illustrating a flexible fixing board of a fourth embodiment of the present invention.

FIG. 13 is a plan view of a flexible fixing board of the present embodiment. FIG. 14 is an exploded perspective view illustrating a fixing structure using the flexible fixing board of the present embodiment. In FIGS. 13 and 14, the same reference numerals are appended to constituent elements common to those shown in FIGS. 4A and 10 referred to in the first embodiment, and description thereof is omitted here.

Regarding a flexible fixing board 91 of the present embodiment, a base film 92 constituting the flexible fixing board 91 is provided on one end thereof with a plurality of dummy electrodes 93 to be connected respectively to the plurality of dummy electrodes 47 on the TFT substrate 32, as shown in FIG. 13. In the case of the flexible fixing board 41 of the first embodiment, only the plurality of dummy electrodes 55 are separately provided as conductors. In the case of the flexible fixing board 91 of the present embodiment, on the other hand, a conductor 94 integrated with the plurality of dummy electrodes 93 is provided over the entire base film 92. Examples of the conductor 94 include a copper foil. The flexible fixing board 91 is provided at substantially the center thereof with a screw hole 91h penetrating in the thickness direction.

Figure 14:
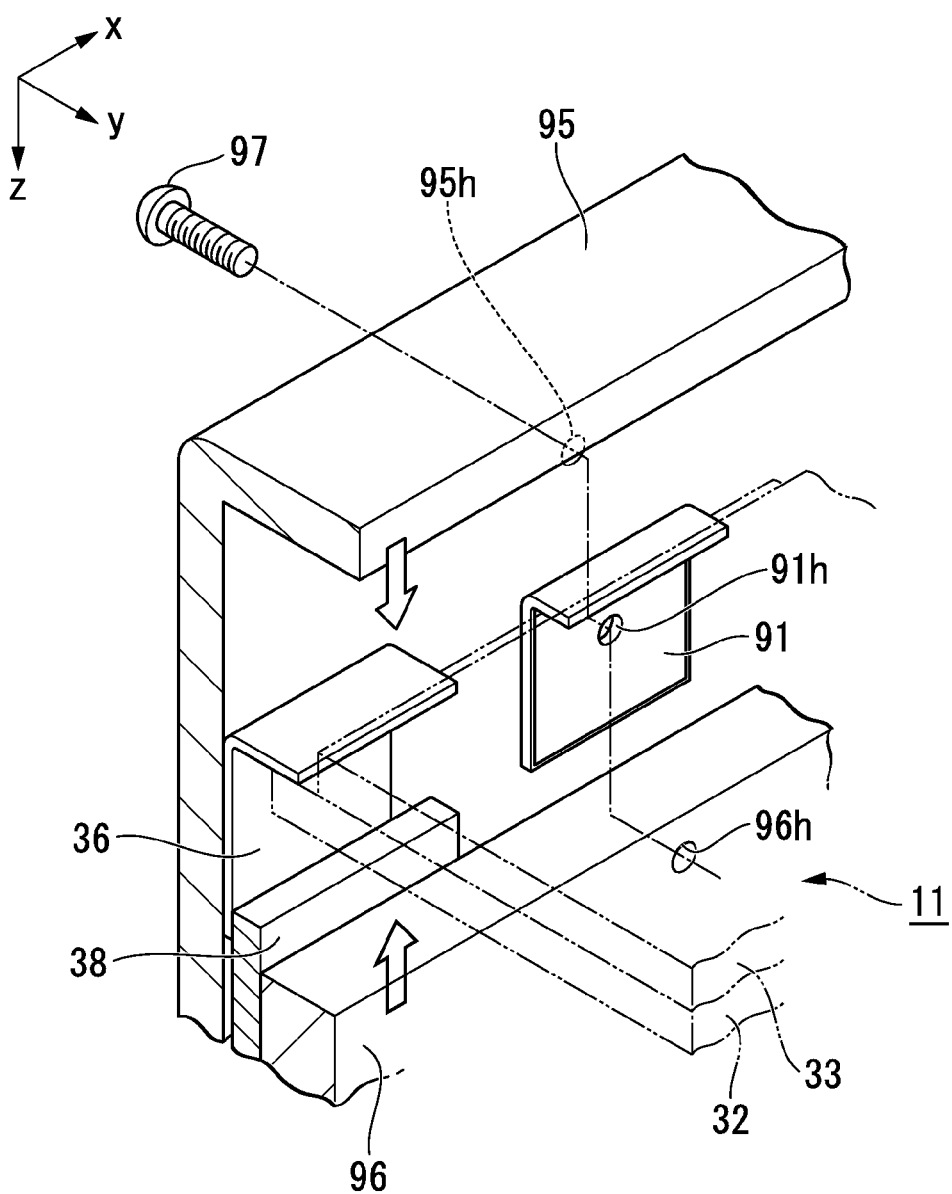
FIG. 14 is an exploded perspective view of a fixing portion viewed from the inside of the bezel.

As shown in FIG. 14, the bezel 95 is provided with a screw hole 95h. A backlight chassis 96 is also provided with a screw hole 96h. The position of the screw hole 95h of the bezel 95 and the position of the screw hole 96h of the backlight chassis 96 correspond to the position of the screw hole 91h of the flexible fixing board 91 at the time the flexible fixing board 91 is sandwiched between the bezel 95 and the backlight chassis 96. In a state where the flexible fixing board 91 is sandwiched between the bezel 95 and the backlight chassis 96, a screw 97 (fastening member) is inserted and fitted into the screw holes 95h, 91h, and 96h sequentially from the outside of the bezel 95. Thus, the flexible fixing board 91 is sandwiched between the bezel 95 and the backlight chassis 96, thus being firmly fixed.

Also in the present embodiment, it is possible to provide, without decreasing the productivity, a liquid crystal display device with excellent impact resistance and excellent reliability, which is a similar effect to that can be achieved in the first embodiment. In the case of the present embodiment, the flexible fixing board 91 is not only sandwiched between the bezel 95 and the backlight chassis 96, but also is fixed by the screw 97, thereby enabling an increase in the impact resistance and the reliability. Additionally, the entire flexible fixing board 91 is covered by the conductor 94, thereby enabling an enhancement of the strength of the flexible fixing board itself, compared to a case where the flexible fixing board 91 is not covered by the conductor 94.

Although the example where the bezel 95, the flexible fixing board 91, and the backlight chassis 96 are fastened by the screw 97 has been shown in the present embodiment, the fastening member is not necessarily limited to a screw. For example, another general screw member, such as a combination of a bolt and a nut, may be used. Alternatively, a rivet may be used as the fastening member. The fixing structure may be such that a rivet is provided on the inner side of the bezel, the rivet is inserted into a hole of each member, and then a head portion of the rivet is stripped, thereby fastening each of the members.

[Fifth Embodiment]

Hereinafter, a fifth embodiment of the present invention will be described with reference to FIGS. 15 and 16.

A liquid crystal display device of the present embodiment has a basic configuration similar to that of the first embodiment and differs therefrom only in the configuration of the flexible fixing board and the fixing structure. Therefore, in the present embodiment, a description of the basic configuration of the liquid crystal display device is omitted, and the flexible fixing board and the fixing structure are described.

Figure 15:
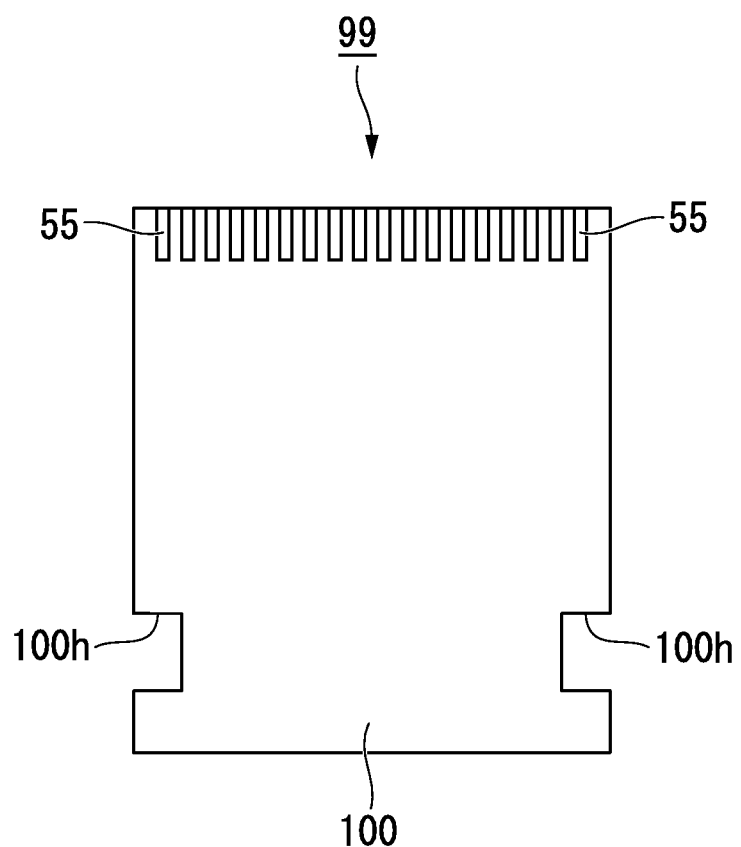
FIG. 15 is a plan view of a flexible fixing board of a fifth embodiment of the present invention.

FIG. 15 is a plan view of a flexible fixing board of the present embodiment. FIG. 16 is an exploded perspective view illustrating a fixing structure using the flexible fixing board of the present embodiment. In FIGS. 15 and 16, the same reference numerals are appended to constituent elements common to those shown in FIGS. 4A and 10 referred to in the first embodiment, and description thereof is omitted here.

Regarding a flexible fixing board 99 of the present embodiment, a base film 100 is provided on one end thereof with a plurality of dummy electrodes 55 to be connected respectively to the plurality of dummy electrodes 47 on the TFT substrate 32, as shown in FIG. 15. The base film 100 is provided with notch portions 100h (cutout portions) at a circumferential portion thereof along two of the four sides, the two sides being perpendicular to the side along which the dummy electrodes 55 are provided. The circumferential portion is closer to the side opposite to the side along which the dummy electrodes 55 are provided. The notch portions 100h are cutout portions from which rectangular portions of the base film 100 have been cut out. Although the example where the notch portions 100h are rectangular has been shown here, the shape thereof is not limited to the rectangular shape. For example, the shape may be a triangular shape or a semicircular shape.

Figure 16:
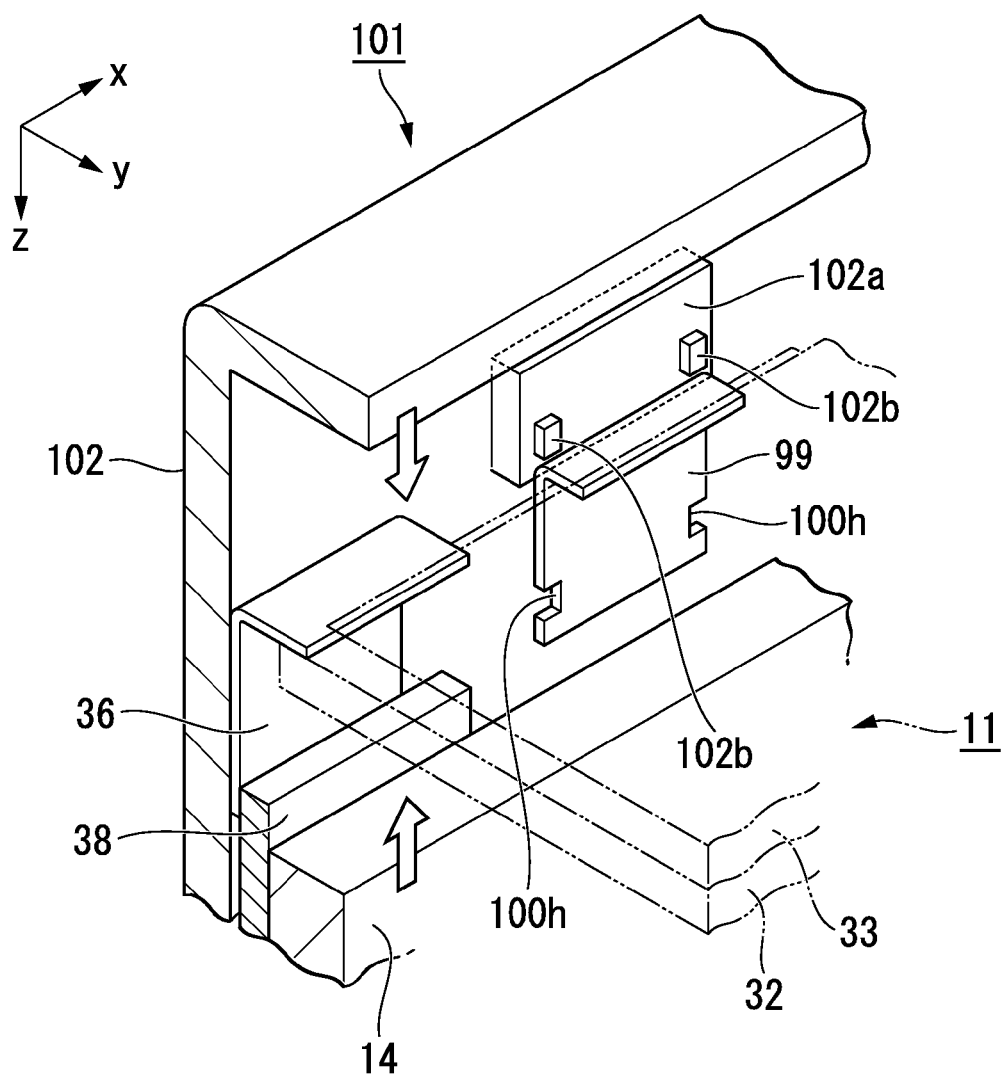
FIG. 16 is an exploded perspective view of a fixing portion viewed from the inside of the bezel.

As shown in FIG. 16, the bezel 101 is provided on the side plate portion 102 with a protruding portion 102a. The protruding portion 102a is provided on a part thereof with two protruding portions 102b protruding further inward from the surface of the protruding portion 102a. When the protruding portions 102b are viewed in a normal direction of the side plate portion 102 of the bezel 101, the protruding portions 102b have substantially the same shape and dimension as those of the notch portions 100h of the flexible fixing board 99. The positions of the protruding portions 102b correspond to the positions of the notch portions 100h of the flexible fixing board 99 at the time the flexible fixing board 99 is sandwiched between the bezel 101 and the backlight chassis 14. In a state where the flexible fixing board 99 is sandwiched between the bezel 101 and the backlight chassis 14, the protruding portions 102b are fitted by insertion into the respective notch portions 100h. Thus, the flexible fixing board 99 is firmly fixed in such a manner so to be sandwiched between the bezel 101 and the backlight chassis 14.

Also in the present embodiment, it is possible to provide, without decreasing the productivity, a liquid crystal display device with excellent impact resistance and excellent reliability, which is a similar effect to that can be achieved in the first embodiment. In the case of the present embodiment, not only the flexible fixing board 99 is sandwiched between the bezel 101 and the backlight chassis 14, but also the protruding portions 102b of the bezel 101 are fitted into the notch portions 100h of the flexible fixing board 99, thereby enabling further enhancement of the impact resistance and the reliability.

Although the notch portions 100h are provided on the circumferential portion of the flexible fixing board 99 in the present embodiment, instead of this structure, the flexible fixing board may be provided with holes so that the protruding portions of the bezel are fitted into those holes, thereby fixing the flexible fixing board. Although the protruding portions are provided on the bezel side in the present embodiment, protruding portions may be provided on the backlight chassis side.

[Sixth Embodiment]

Hereinafter, a sixth embodiment of the present invention will be described with reference to FIG. 17.

A liquid crystal display device of the present embodiment has a basic configuration similar to that of the first embodiment and differs therefrom only in a fixing structure of the flexible fixing boards. Therefore, in the present embodiment, description of the basic configuration of the liquid crystal display device is omitted, and the fixing structure of the flexible fixing boards is described.

Figure 17:
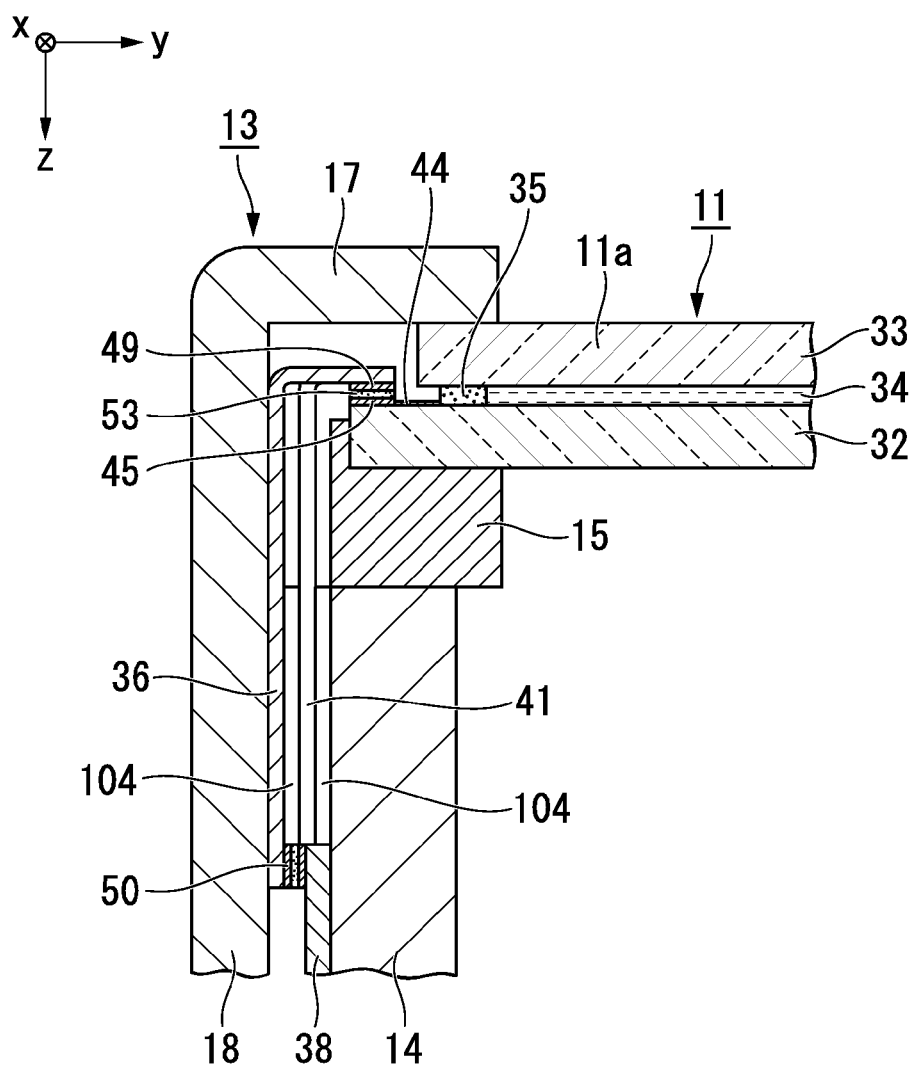
FIG. 17 is an enlarged cross-sectional view illustrating a fixing portion of a liquid crystal display panel of a sixth embodiment of the present invention.

FIG. 17 is a cross-sectional view of a fixing portion of a flexible fixing board of the present embodiment. In FIG. 17, the same reference numerals are appended to constituent elements common to those shown in FIG. 8 referred to in the first embodiment, and a description thereof is omitted here.

In the present embodiment, two double-stick adhesive tapes 104 (adhesive members) for fixing the flexible fixing board 41 to the chassis are used, as shown in FIG. 17. In other words, the bezel 13 and the flexible fixing board 41 are stuck to each other by the double-stick adhesive tapes 104. Similarly, the backlight chassis 14 and the flexible fixing board 41 are stuck to each other by the double-stick adhesive tapes 104. Thus, the flexible fixing board 41 is sandwiched between the bezel 13 and the backlight chassis 14, thereby being firmly fixed.

Also in the present embodiment, it is possible to provide, without decreasing the productivity, a liquid crystal display device with excellent impact resistance and excellent reliability, which is a similar effect to that can be achieved in the first embodiment. In the case of the present embodiment, not only the flexible fixing board 41 is sandwiched between the bezel 13 and the backlight chassis 14, but also the flexible fixing board 41 is stuck by the two double-stick adhesive tapes 104 to both the bezel 13 and the backlight chassis 13, thereby enabling an enhancement of the impact resistance and the reliability.

Although the double-stick adhesive tapes 104 have been used in the present embodiment in order to stick the flexible fixing board and the bezel or the backlight chassis 14, in lieu of this structure, the flexible fixing board and the bezel or the backlight chassis may be stuck to each other by a glue.

[Other Examples of Flexible Fixing Board]

Figure 18:
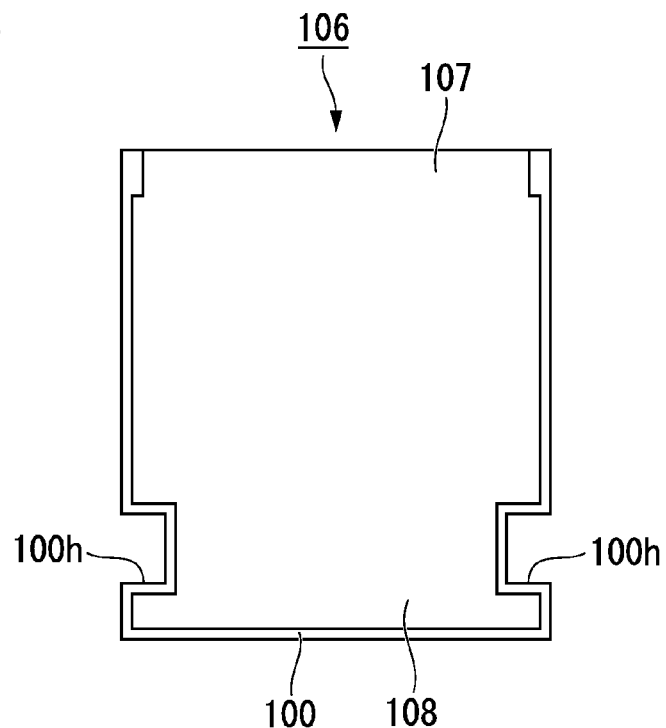
FIG. 18 is a plan view illustrating a modified example of the flexible fixing board of the present invention.
Figure 19:
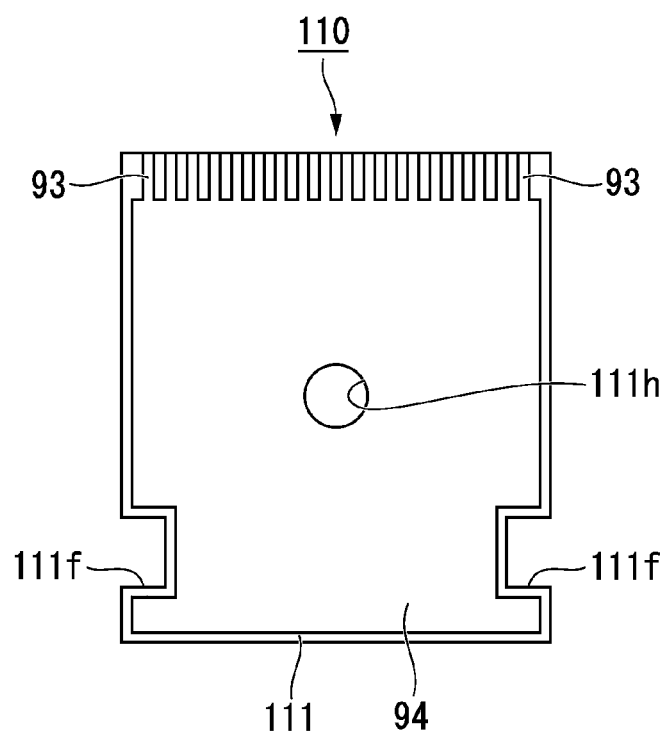
FIG. 19 is a plan view illustrating another modified example of the flexible fixing board of the present invention.

Hereinafter, other examples of the flexible fixing board are described with reference to FIGS. 18 and 19. In FIGS. 18 and 19, the same reference numerals are appended to constituent elements common to those referred to in the previous embodiment, and a description thereof is omitted here.

Regarding a flexible fixing board 106 shown in FIG. 18, a dummy electrode unit 107 to be connected to the plurality of dummy electrodes 47 on the TFT substrate 32 is not divided into a plurality of electrodes, but is configured as one integrated conductor. Further, a conductor 108 integrated with the dummy electrode unit 107 is also provided over the entire base film 100 including regions other than the region of the dummy electrode unit 107. According to the flexible fixing board 106 of the present modified example, the dummy electrode unit 107 is configured as an integrated conductor, thereby enabling an enhancement of the strength of the flexible fixing board 106, particularly, the strength of the dummy electrode unit 107 included in the flexible fixing board 106.

A flexible fixing board 110 shown in FIG. 19 is provided on a base film 111 thereof with a screw hole 111h used in the fourth embodiment and notch portions 111f used in the fifth embodiment. In a case where the flexible fixing board 110 of the present modified example is used, for example, the protruding portions of the bezel are fitted into the notch portions 111f, and a screw is fitted into the screw hole 111f, thereby making it possible to firmly fix the bezel, the flexible fixing board 110, and the backlight chassis.

Here, the technical scope of the present invention is not limited to the above embodiments, and various modifications can be made without departing from the scope of the present invention.

For example, although the example where the flexible fixing board is fixed in such a manner as to be sandwiched between the bezel and the backlight chassis has been shown in the above embodiments, the configuration is not limited to this fixing structure. For example, a structure such that the flexible fixing board is fixed only to any one of the bezel and the backlight chassis may be used. Additionally, the chassis to which the flexible fixing board is fixed is not necessarily limited to the bezel and the backlight chassis. For example, a frame to be disposed between the bezel and the backlight chassis may be used.

Other than those, the shape, the arrangement, the number, the quality, and the like of each constituent element of the liquid crystal display device of the above embodiments are not limited to those in the above embodiments, and various modifications may be made. Additionally, although examples of the liquid crystal display device have been shown in the above embodiments, the present invention is also applicable to display devices, such as an organic EL display device and a plasma display.

Industrial Applicability

The present invention is applicable to various display devices, such as a liquid crystal display device, an organic EL display device, and a plasma display.

Description Of Reference Numerals

1: television reception apparatus
2: liquid crystal display device (display device)
9: display device main body
10: chassis
11, 87, 89: liquid crystal display panel
12: backlight (lighting system)
13, 95: bezel (first chassis)
14, 96: backlight chassis (second chassis)
17h: opening
18, 102a, 102b: protruding portion
36: source driver FPC (flexible print wiring board)
37: gate driver FPC (flexible print wiring board)
41, 91, 99, 106, 110: flexible fixing board
43: source electrode unit (electrode unit)
45: electrode
46: dummy electrode unit
47: dummy electrode unit
91h, 111h: screw hole (hole)
97: screw (fixing member, fastening member)
100h, 111f: notch portion (cutout portion)
104: double-stick tape (fixing member, adhesive material)

The invention claimed is:
1. A display device comprising:
a display device main body including a display panel provided on a circumferential portion thereof with an electrode unit and a dummy electrode unit;
a chassis housing the display device main body;
a flexible print wiring board configured to be electrically connected to the electrode unit and supply an electric signal to the display panel; and
a flexible fixing board connected to the dummy electrode unit and fixed to the chassis.
2. The display device according to claim 1, wherein the flexible print wiring board and the flexible fixing board are connected to one side of the display panel that is rectangular in shape.
3. The display device according to claim 2, wherein the flexible print wiring board and the flexible fixing board are connected to a side of the display panel which is extending in a longitudinal direction of the display panel.
4. The display device according to claim 2, wherein the flexible print wiring board and the flexible fixing board are connected to four sides of the display panel.
5. The display device according to claim 2, wherein along one side of the display panel, the flexible fixing board is disposed among a plurality of flexible print wiring boards including the flexible print wiring board.

6. The display device according to claim 2, wherein the flexible fixing board is disposed at a plurality of points along one side of the display panel.

7. The display device according to claim 1, wherein the electrode unit comprises a plurality of electrodes, and
the dummy electrode unit comprises a plurality of dummy electrodes.

8. The display device according to claim 7, wherein the plurality of electrodes and the plurality of dummy electrodes are arranged at the same pitch.

9. The display device according to claim 1, wherein the chassis comprises a first chassis and a second chassis, the first chassis covering the display device main body from a display surface side and exposing a display region of the display panel, and the second chassis covering the display device main body from a side opposite to the display surface side, and
the flexible fixing board is sandwiched between the first chassis and the second chassis.

10. The display device according to claim 9, wherein any one of the first chassis and the second chassis is provided with a protruding portion protruding toward the other one of the first chassis and the second chassis, and
the flexible fixing board is sandwiched between the protruding portion and the other one of the first chassis and the second chassis.

11. The display device according to claim 9, further comprising:
a fixing member configured to fix the flexible fixing board to at least one of the first chassis and the second chassis.

12. The display device according to claim 11, wherein the fixing member is a fastening member, and
the flexible fixing board is fixed to at least one of the first chassis and the second chassis while the fastening member is inserted into a hole provided in the flexible fixing board.

13. The display device according to claim 11, wherein the fixing member is an adhesive member, and
the flexible fixing board is fixed via the adhesive member to at least one of the first chassis and the second chassis.

14. The display device according to claim 9, wherein the flexible fixing board is provided with a cutout portion, and
any one of the first chassis and the second chassis is provided with a protruding portion at a position corresponding to that of the cutout portion, the protruding portion being fitted into the cutout portion.

15. The display device according to claim 9, wherein the display device main body comprises:
the display panel including a liquid crystal display panel; and
a lighting system configured to emit light to the liquid crystal display panel.

16. A television reception apparatus comprising:
a display device wherein the display device comprises:
a display device main body including a display panel provided on a circumferential portion thereof with an electrode unit and a dummy electrode unit;
a chassis housing the display device main body;
a flexible print wiring board configured to be electrically connected to the electrode unit and supply an electric signal to the display panel; and
a flexible fixing board connected to the dummy electrode unit and fixed to the chassis.

* * * * *